(12) United States Patent  
Yanagisawa et al.

(10) Patent No.: US 7,654,406 B2  
(45) Date of Patent: Feb. 2, 2010

(54) SLIDE COVER AND ELECTRONIC DEVICE HAVING SLIDE COVER

(75) Inventors: Michinobu Yanagisawa, Kanagawa (JP); Hirokuni Miyai, Tokyo (JP); Takuya Nakajyou, Chiba (JP); Hiroki Ueno, Tokyo (JP)

(73) Assignee: Sony Corporation, Tokyo (JP)

( * ) Notice: Subject to any disclaimer, the term of this patent is extended or adjusted under 35 U.S.C. 154(b) by 773 days.

(21) Appl. No.: 10/537,721

(22) PCT Filed: Oct. 7, 2004

(86) PCT No.: PCT/JP2004/015200

§ 371 (c)(1),  
(2), (4) Date: Jun. 7, 2005

(87) PCT Pub. No.: WO2005/036252

PCT Pub. Date: Apr. 21, 2005

(65) Prior Publication Data

US 2006/0163095 A1     Jul. 27, 2006

(30) Foreign Application Priority Data

Oct. 9, 2003    (JP)   ............................ 2003-350371

(51) Int. Cl.  
*B65D 43/12*    (2006.01)  
*B65D 43/20*    (2006.01)  
*G03B 17/02*    (2006.01)

(52) U.S. Cl. ................. 220/345.3; 220/345.2; 220/348; 396/536

(58) Field of Classification Search ... 220/345.1–345.4, 220/348, 351; 206/316.2; 396/536  
See application file for complete search history.

(56) References Cited

U.S. PATENT DOCUMENTS 2,263,180 A * 11/1941 Lofgren ........................ 292/51

FOREIGN PATENT DOCUMENTS

| JP | 1 149627 | 10/1989 |
| JP | 8-101438 | 4/1996 |
| JP | 2000 155355 | 6/2000 |
| JP | 2000-305131 | 11/2000 |
| JP | 2003-222929 | 8/2003 |

* cited by examiner

*Primary Examiner*—Robin Hylton  
(74) *Attorney, Agent, or Firm*—Frommer Lawrence & Haug LLP; William S. Frommer

(57) ABSTRACT

A sliding cover includes an outside plate, a structural member fixed to the rear face of the outside plate, a movable holding member disposed between the outside plate and the structural member, and a toggle disposed between the holding member and the outside plate or the structural member. The holding member includes two parallel racks and guiding portions disposed at both end portions and extending in the same direction as the racks. The holding member includes a holding plate; an even number of pinions meshed with each other and supported by the holding plate so as to be rotatable; and guiding components supported by the holding plate. The pinions, disposed between the guiding components, are meshed with the racks, and the guiding components are engaged with the guiding portions so as to be slidable. The biasing direction in which the toggle biases the holding member is reversed substantially at the midpoint of the movable range of the holding member.

8 Claims, 20 Drawing Sheets

SLIDE COVER AND ELECTRONIC DEVICE HAVING SLIDE COVER

TECHNICAL FIELD

The present invention relates to novel sliding covers and electronic devices having sliding covers. In particular, the present invention provides thin sliding covers that can be stably and smoothly opened and closed and that can be easily attached to device bodies, and electronic devices provided with the above-described sliding covers.

BACKGROUND ART

A variety of electronic devices include sliding covers that open and close sections to be blocked. In such devices, for example, the sections to be blocked are protected by retaining the sliding covers in a closed state when the devices are not in use, and the sections are exposed by changing the state of the sliding covers to an open state when the devices are in use. For example, digital cameras include sliding covers for opening and closing lens sections and strobe sections. The sliding covers are retained in the closed state so as to cover the lens sections and the strobe sections when the digital cameras are not in use, and the state of the sliding covers is changed to the open state to expose the lens sections and the strobe sections to the front when the digital cameras are in use.

Among such sliding covers, a sliding cover having two pinions (10, 11) that synchronously rotate and are respectively meshed with two parallel racks (4, 4) formed in a lens cover (2) so as to stabilize the amount of force required to open and close the lens cover (2) is disclosed in Japanese Unexamined Patent Application Publication No. 2000-305131. Moreover, in Japanese Unexamined Patent Application Publication No. 2000-305131, one end of a lever (14) is linked to an eccentric position of the pinion (10) so as to be rotatable, and a pin (15b) provided on the other end of the lever (14) is engaged with a cam groove formed in an optical device body (1) so as to be slidable. A coiled spring (19) is stretched between a hook (17) of the lever (14) and a hook (18) provided on the optical device body (1) to form toggling means. The toggling means biases the lens cover (2) in the closing direction when the lens cover (2) is located adjacent to the closed position, and biases in the opening direction when the lens cover (2) is located adjacent to the open position. The toggling means reverses the biasing direction at the midpoint of the slidable range of the lens cover (2).

In the lens cover (2) disclosed in Japanese Unexamined Patent Application Publication No. 2000-305131, a sliding force applied to any portions of the lens cover (2) is evenly transmitted to the two racks (4, 4) by the pinions (10, 11) that synchronously rotate. Thus, the opening and closing operations can be stabilized.

The lens cover (2) disclosed in Japanese Unexamined Patent Application Publication No. 2000-305131 has an advantage in that the amount of force for opening and closing can be stabilized. However, the overall structure cannot be made compact, and has poor assembling workability.

That is to say, members required to form the lens cover (2), such as a metal sheet (9) having the cam groove (16) and the hook (18), and the coiled spring (19), are provided on the optical device body (1). Therefore, the optical device body (1) requires spaces for disposing these members, thus increasing the size. Accordingly, the optical device body (1) cannot be reduced in size.

In addition, incorporation of the lens cover (2) into the optical device body (1) requires additional work operations such as fixing the metal sheet (9) to the optical device body (1) and engaging the pin (15b) provided on the other end of the lever (14) with the cam groove (16) of the metal sheet (9) so as to be slidable, and hanging both ends of the coiled spring (19) on the hook (17) of the lever (14) and the hook (18) of the metal sheet (9) while the coiled spring (19) is stretched. Therefore, it is time consuming to assemble the lens cover (2) into the optical device body (1), and this causes lower manufacturing efficiency and an increase in costs.

DISCLOSURE OF INVENTION

Accordingly, it is an object of the present invention to provide a thin sliding cover that can be stably and smoothly opened and closed and that can be easily attached to a device body, and an electronic device provided with the above-described sliding cover.

To solve the above-described problems, the sliding cover according to the present invention includes an outside plate, a structural member fixed to the rear face of the outside plate, a movable holding member disposed in a space between the outside plate and the structural member, and toggling means disposed between the holding member and the outside plate or the structural member. The sliding cover is characterized in that the holding member includes two parallel racks and guiding portions disposed at both end portions and extending in the same direction as the racks; the holding member includes a holding plate, an even number of pinions meshed with each other and supported by the holding plate so as to be rotatable, and guiding components supported by the holding plate, the even number of pinions being disposed between the guiding components; the pinions located at both ends are meshed with the racks, and the guiding components are engaged with the guiding portions so as to be slidable; and the biasing direction in which the toggling means biases the holding member is reversed substantially at the midpoint of the movable range of the holding member.

Furthermore, to solve the above-described problems, the electronic device having the sliding cover according to the present invention is characterized in that the sliding cover is provided on a body such that the state of the sliding cover can be changed between a closed state to block sections to be closed and an open state for exposing the sections; the sliding cover includes an outside plate, a structural member fixed to the rear face of the outside plate, a movable holding member disposed in a space between the outside plate and the structural member, and toggling means disposed between the holding member and the outside plate or the structural member; the holding member includes two parallel racks and guiding portions disposed at both end portions and extending in the same direction as the racks; the holding member includes a holding plate, an even number of pinions meshed with each other and supported by the holding plate so as to be rotatable, and guiding components supported by the holding plate, the even number of pinions being disposed between the guiding components; the pinions located at both ends meshed with the racks, and the guiding components are engaged with the guiding portions so as to be slidable; the biasing direction in which the toggling means biases the holding member is reversed substantially at the midpoint of the movable range of the holding member; and the sliding cover is retained on the body by fixing the holding member of the sliding cover to the body.

According to the present invention, all the required members are supported by the outside plate and the structural member fixed to the rear face of the outside plate. Since no members are attached to the body to which the sliding cover is attached, no spaces are required to dispose members of the sliding covers on the body.

In addition, the sliding cover can be assembled into the body only by fixing the holding member to the body. Thus, a high assembling workability into the body can be achieved.

The sliding cover according to the present invention includes the outside plate, the structural member fixed to the rear face of the outside plate, the movable holding member disposed in the space between the outside plate and the structural member, and the toggling means disposed between the holding member and the outside plate or the structural member, and is characterized in that the holding member includes the two parallel racks and the guiding portions disposed at both end portions and extending in the same direction as the racks; the holding member includes the holding plate, the even number of pinions meshed with each other and supported by the holding plate so as to be rotatable, and the guiding components supported by the holding plate, the even number of pinions being disposed between the guiding components; the pinions located at both ends are meshed with the racks, and the guiding components are engaged with the guiding portions so as to be slidable; and the biasing direction in which the toggling means biases the holding member is reversed substantially at the midpoint of the movable range of the holding member.

The electronic device having the sliding cover according to the present invention is characterized in that the sliding cover is provided on the body such that the state of the sliding cover can be changed between the closed state to block sections to be closed and the open state for exposing the sections; the sliding cover includes the outside plate, the structural member fixed to the rear face of the outside plate, the movable holding member disposed in the space between the outside plate and the structural member, and the toggling means disposed between the holding member and the outside plate or the structural member; the holding member includes the two parallel racks and the guiding portions disposed at both end portions and extending in the same direction as the racks; the holding member includes the holding plate, the even number of pinions meshed with each other and supported by the holding plate so as to be rotatable, and the guiding components supported by the holding plate, the even number of pinions being disposed between the guiding components; the pinions located at both ends meshed with the racks, and the guiding components are engaged with the guiding portions so as to be slidable; the biasing direction in which the toggling means biases the holding member is reversed substantially at the midpoint of the movable range of the holding member; and the sliding cover is retained on the body by fixing the holding member of the sliding cover to the body.

According to the present invention, all the required members are supported by the outside plate and the structural member fixed to the rear face of the outside plate. Since no members are attached to the body to which the sliding cover is attached, no spaces are required to dispose members of the sliding covers on the body. Accordingly, the body can be reduced in size.

Moreover, all the required members can be assembled into the sliding cover. Accordingly, the sliding cover can be treated as a single component, and can be easily handled in terms of parts management, transit, and the like.

In addition, the sliding cover can be assembled into the body only by fixing the holding member to the body. Thus, a high assembling workability into the body can be achieved.

According to one aspect of the invention, the sliding cover is characterized in that the structural member further includes an operating projection protruding to the opposite side of the outside plate. Accordingly, the operating projection can operate a switch and the like provided in the body so as to cause the body to carry out operations and the like associated with the opening and closing of the sliding cover.

According to another aspect of the invention, the sliding cover is characterized in that the operating projection has a pushing surface inclined to the moving direction of the holding member, and is supported by the structural member so as to be rotatable; and the pushing surface is biased by biasing means interposed between the structural member and the operating projection such that the sides of the pushing surface along the rotational axis are perpendicular to the moving direction of the holding member. Accordingly, even with variations in the clearance between the sliding cover and the body, the operating projection can reliably push a pressure-receiving member such as an operation-receiving piece of the switch provided in the body by disposing the operating projection so as to protrude toward the body by a somewhat larger amount. Also, even when the operating projection is too close to the body, the operating projection can reliably operate by rotating the operating projection against the biasing force, and damage to the operating projection, the sliding cover, the body, and the like can be avoided.

According to a further aspect of the invention, the sliding cover is characterized in that the operating projection is formed of a spring having a pushing surface inclined to the moving direction of the holding member, and the pushing surface is resilient to the moving direction of the holding member. Accordingly, even with variations in the clearance between the sliding cover and the body, the operating projection can reliably push the pressure-receiving member such as the operation-receiving piece of the switch provided in the body by disposing the operating projection so as to protrude toward the body by a somewhat larger amount. Also, even when the operating projection is too close to the body, the operating projection bends due to the resilience of the spring. Thus, the operating projection can reliably operate, and damage to the operating projection, the sliding cover, the body, and the like can be avoided.

According to an application of the invention, the electronic device is characterized in that the sliding cover includes an operating projection protruding to the opposite side of the outside plate; and a switch provided in the body is operated when the state of the sliding cover is changed. Accordingly, operations associated with the opening and closing of the sliding cover can be performed. For example, in a digital camera, the opening of the sliding cover causes a ready state for taking pictures, and closing of the sliding cover causes a state where the power is turned off.

According to an aspect of this application of the invention, the electronic device characterized in that the operating projection includes a pushing surface inclined to the moving direction of the holding member, and is supported by the structural member so as to be rotatable; the pushing surface is biased by biasing means interposed between the structural member and the operating projection such that the sides of the pushing surface along the rotational axis are perpendicular to the moving direction of the holding member, and is biased in the direction in which the pushing surface pushes an operation-receiving piece of the switch provided in the body; and the biasing force of the biasing means is large enough to push the operation-receiving piece of the switch. Accordingly, even with variations in the clearance between the sliding cover and the body, the operating projection can reliably push the operation-receiving piece of the switch provided in the body by disposing the operating projection so as to protrude toward the body by a somewhat larger amount. Also, even when the operating projection is too close to the body, the operating projection can reliably operate by rotating the operating projection against the biasing force, and damage to the operating projection, the sliding cover, the body, and the like can be avoided.

According to a further aspect of this application of the invention, the electronic device is characterized in that the operating projection is formed of a spring having a pushing surface inclined to the moving direction of the holding member, the pushing surface is resilient to the moving direction of the holding member, and the resilience is large enough to push the operation-receiving piece of the switch. Accordingly, even with variations in the clearance between the sliding cover and the body, the operating projection can reliably push the operation-receiving piece of the switch provided in the body by disposing the operating projection so as to protrude toward the body by a somewhat larger amount. Also, even when the operating projection is too close to the body, the operating projection bends due to the resilience of the spring. Thus, the operating projection can reliably push the operation-receiving piece of the switch, and damage to the operating projection, the sliding cover, the body, and the like can be avoided.

BRIEF DESCRIPTION OF THE DRAWINGS

FIG. 1, and also FIG. 1 is a schematic perspective view of the sliding cover in a closed state.

FIG. 2 is a schematic perspective view of the sliding cover in an open state.

FIG. 3 is a schematic perspective view when viewed from the rear.

FIG. 4 is an exploded perspective view.

FIG. 5 is a perspective view shown from the inside.

FIG. 6 is a front view when the outside plate of the sliding cover is removed.

FIG. 7 is an enlarged exploded perspective view illustrating a connected portion between a holding member and a guide.

FIG. 8 is a rear view in the closed state.

FIG. 9 is a rear view in the open state.

FIG. 10 is an enlarged exploded perspective view illustrating an operating projection and a portion supporting the operating projection.

FIG. 11 is an enlarged cross-sectional view of an essential portion illustrating the operating projection and a switch operated by the operating projection.

FIG. 12, and also FIGS. 13 and 14, are cross-sectional views of the essential portion illustrating how the operating projection operates the switch when a clearance between the operating projection and the switch is normal (as designed). FIG. 12 illustrates the sliding cover in the closed state.

FIG. 13 illustrates the sliding cover substantially between in the closed state and in the open state.

FIG. 14 illustrates a state when the operating projection operates the switch.

FIG. 15 illustrates a state when the operating projection operates the switch in a case where the clearance between the operating projection and the switch is smaller than the normal value.

FIG. 16 illustrates a state when the operating projection operates the switch in a case where the clearance between the operating projection and the switch is larger than the normal value.

FIG. 17 is a rear view of an essential portion illustrating a modification in the arrangement of the operating projection and the switch.

FIG. 18 is an enlarged cross-sectional view of an essential portion illustrating a modification of the operating projection.

BEST MODE FOR CARRYING OUT THE INVENTION

Sliding covers and electronic devices having sliding covers according to embodiments of the present invention will now be described with reference to the drawings. In these embodiments, the present invention is applied to digital cameras having sliding covers.

FIGS. 1 to 18 illustrate a first embodiment of the present invention.

Figure 1:
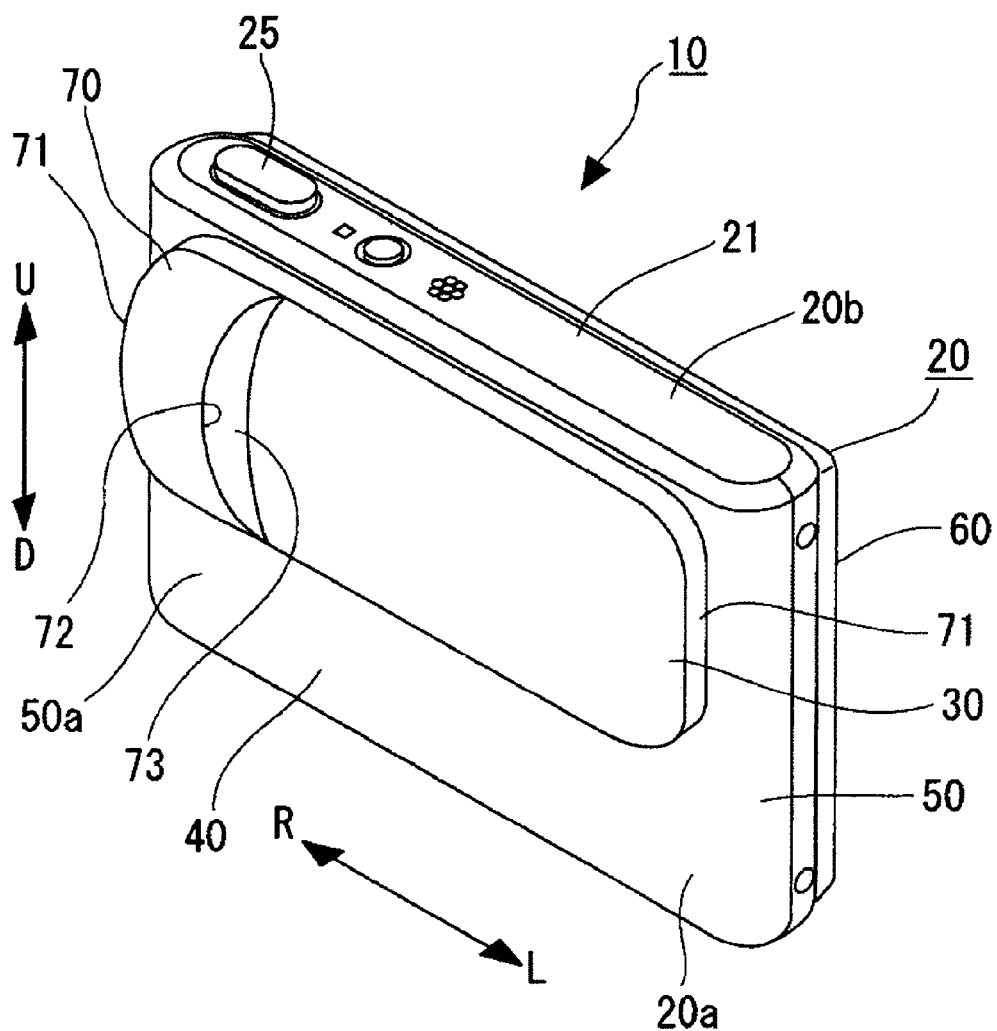
FIG. 1 illustrates an electronic device having a sliding cover according to an embodiment of the present invention when applied to a digital camera.
Figure 2:
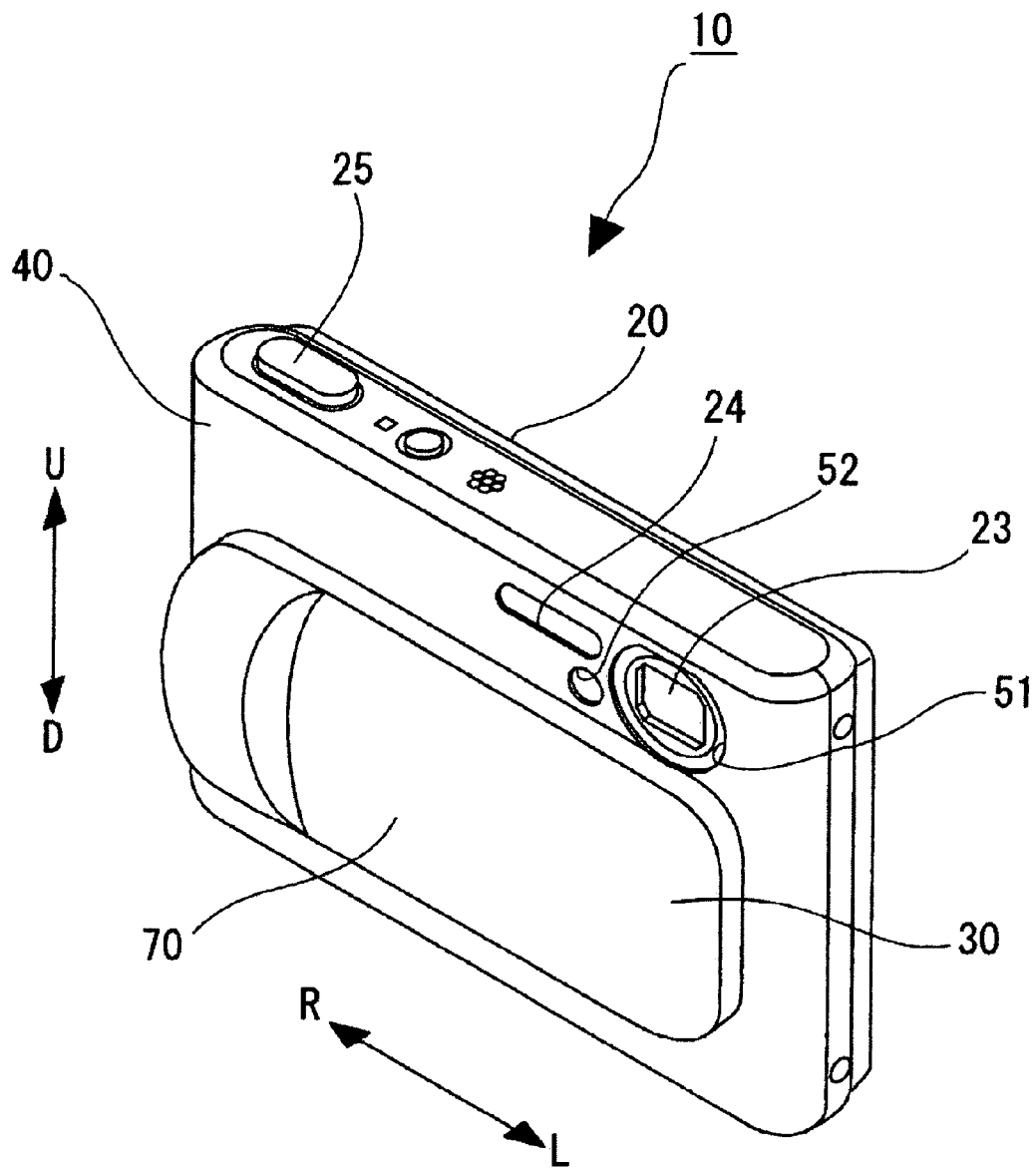
FIGS. 2 and 3, illustrate the external views of the digital camera.
Figure 3:
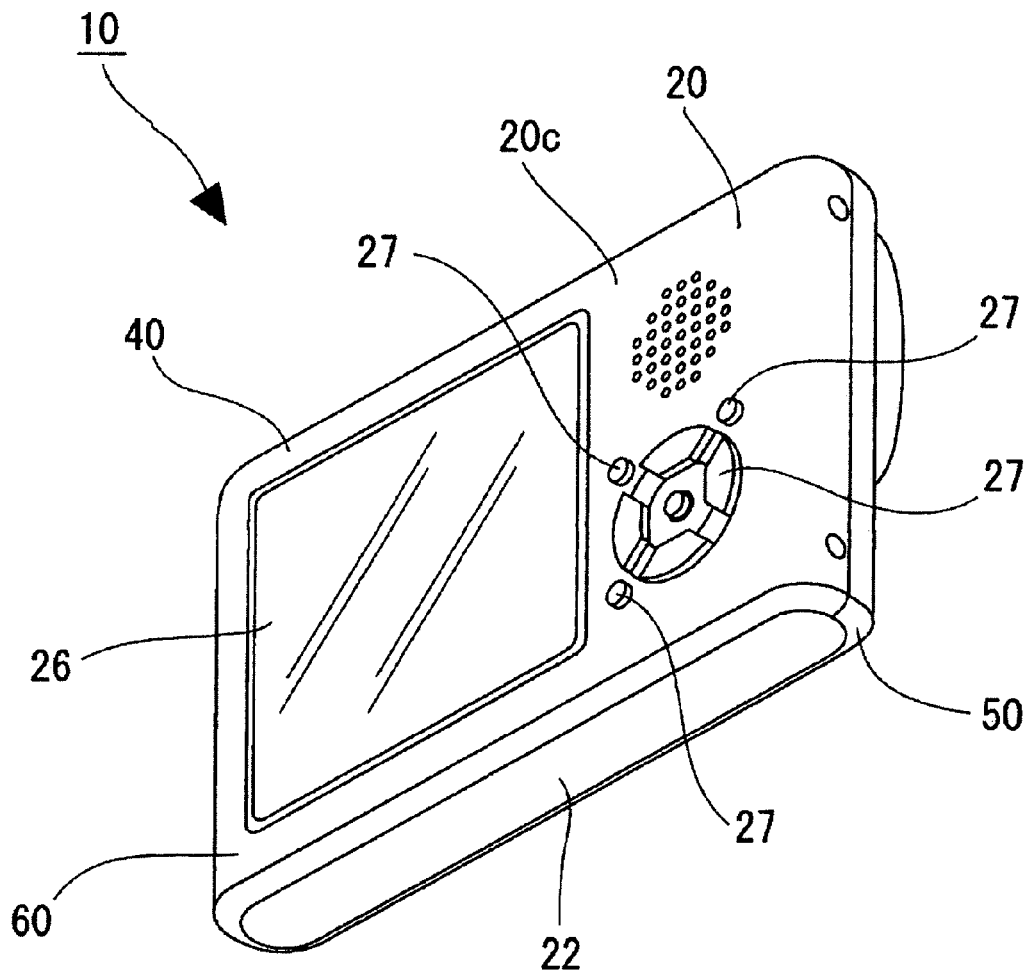

With reference to FIGS. 1 to 3, a digital camera 10 includes a body 20, and a sliding cover 30 (strictly speaking, parts of the sliding cover 30) attached to the front surface 20a of the body 20 so as to be movable in the vertical direction, i.e. in the direction of a double-headed arrow U-D shown in FIG. 1.

The body 20 is a rectangle that is slightly longer in the horizontal direction, i.e. in the direction of an double-headed arrow L-R shown in the drawings, and is formed of a flat casing 40 that is thinner in the width direction and that contains required components and members disposed therein. The casing 40 includes a front case 50 and a rear case 60 joined together. The upper end of the casing 40 is closed with a top plate 21, and the lower end is closed with a bottom plate 22 (see FIG. 3).

An approximately circular opening 51 is disposed on the upper left of the front surface 20a of the body 20. The front end of an imaging lens 23 faces forward from the opening 51. A strobe 24 and a beam-emitting port 52 for measuring the distance are disposed adjacent to the right side of the opening 51.

A shutter button 25 is disposed on the top surface 20b of the body 20 adjacent to the right end. A liquid-crystal display (LCD) 26 is disposed on the rear surface 20c of the body 20 so as to occupy most of the surface except for the right portion. A plurality of operating buttons 27 is disposed between the LCD 26 and the right end of the body 20 (see FIG. 3).

As described above, the essential components of the sliding cover 30 are attached to the front surface 20a of the body 20 so as to be vertically movable. When the sliding cover 30 is in the upper position of the movable range, i.e. in a closed state (see FIG. 1), the sliding cover 30 blocks the opening 51 for the lens, the strobe 24, and the beam-emitting port 52. When the sliding cover 30 is in the lower position of the movable range, i.e. in an open state (see FIG. 2), the sliding cover 30 exposes the opening 51 for the lens, the strobe 24, and the beam-emitting port 52.

Figure 4:
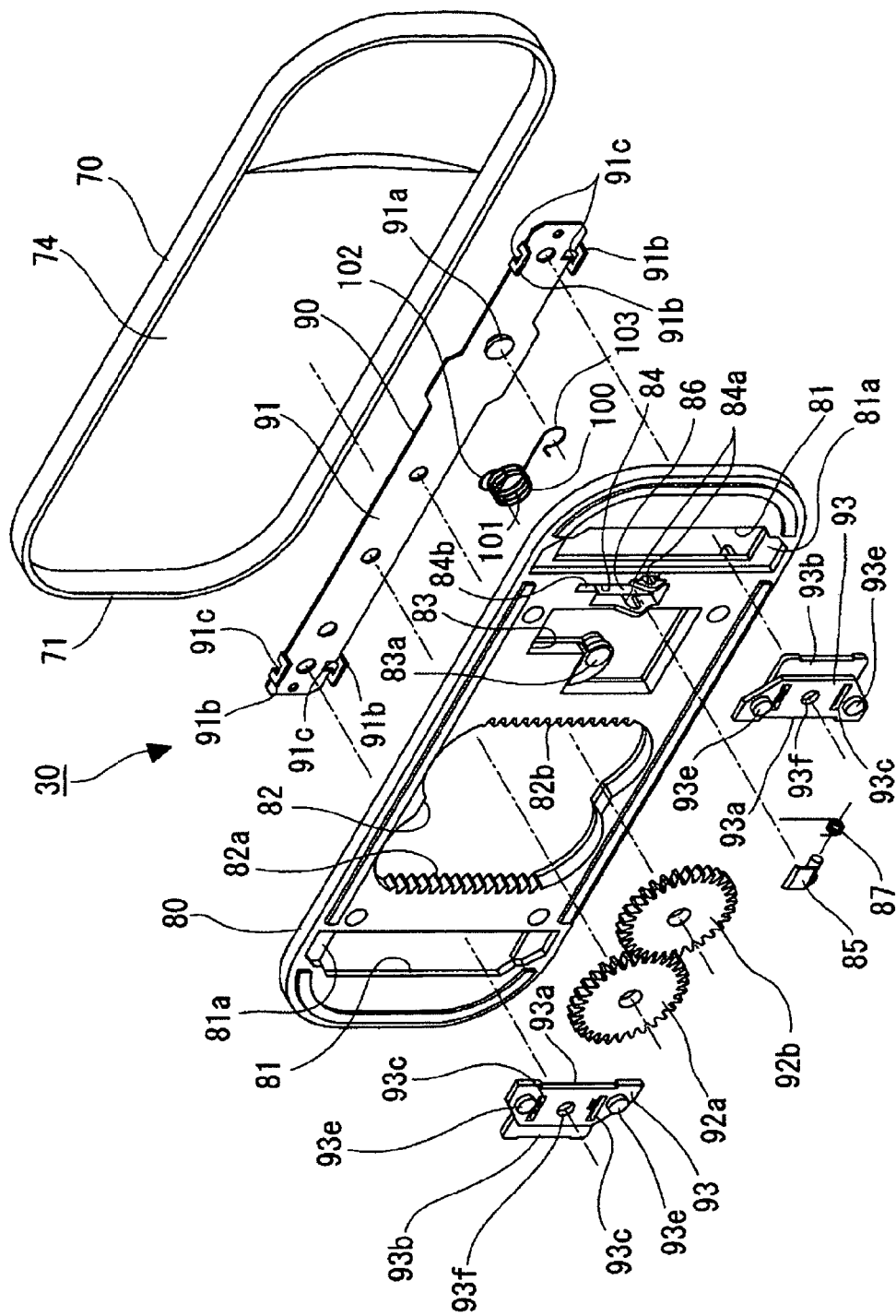
FIG. 4, and also

With reference to FIG. 4, the sliding cover 30 includes an outside plate 70, a structural member 80 fixed to the rear face of the outside plate 70, a movable holding member 90 disposed in a space between the outside plate 70 and the structural member 80, and toggling means 100 disposed between the holding member 90 and the outside plate 70 or the structural member 80. As described below, the holding member 90 is fixed to the body 20, and only the outside plate 70 and the structural member 80 (the above-described essential components) move with respect to the body 20. In this specification, expressions such as "the sliding cover 30 moves" and "the sliding cover 30 moves toward a closed position or an open position" refer to the transfer of the outside plate 70 and the structural member 80, and to the transfer of the outside plate 70 and the structural member 80 toward the closed position or the open position.

Figure 5:
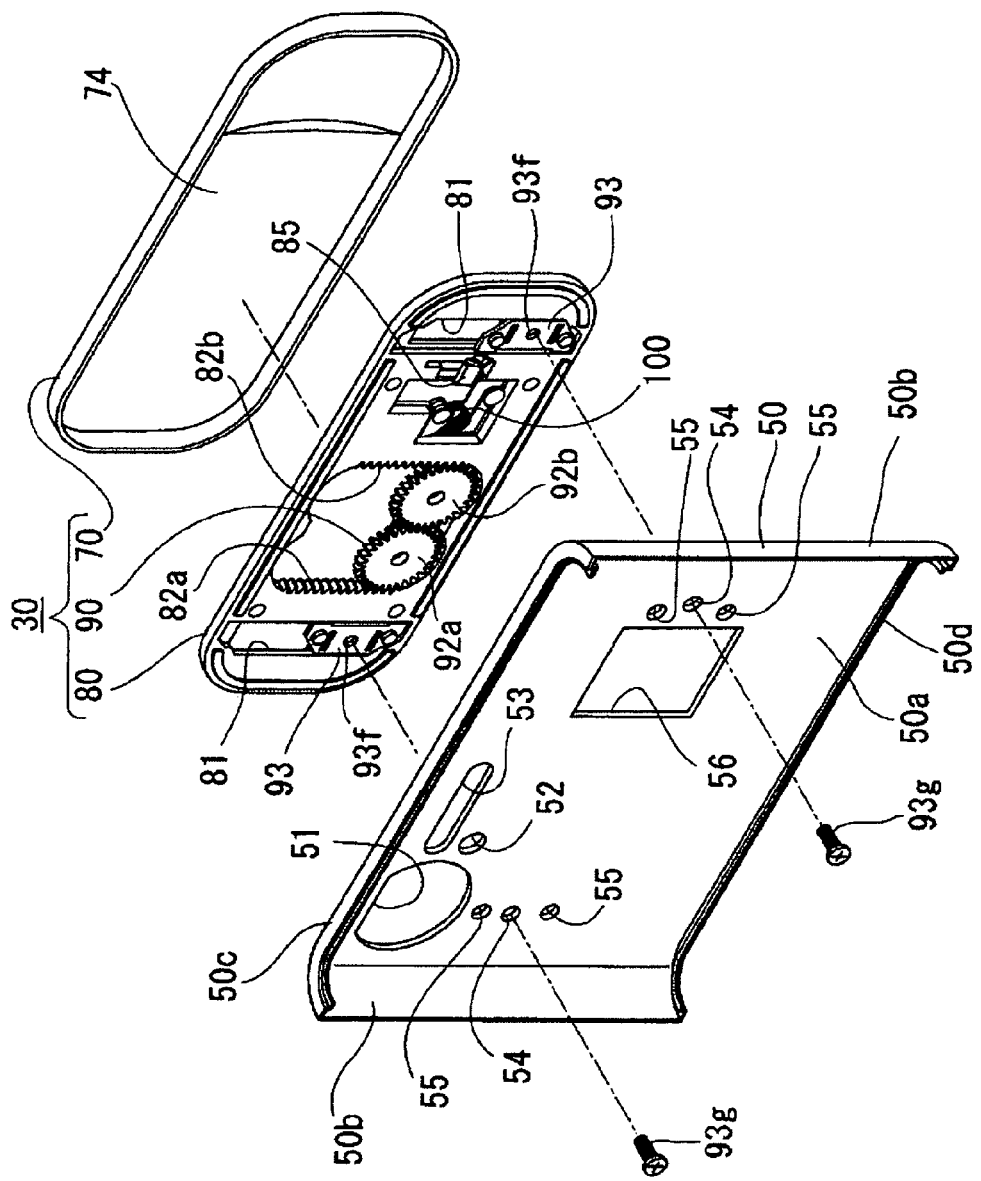
FIGS. 5 to 18, illustrate the sliding cover in detail.
Figure 6:
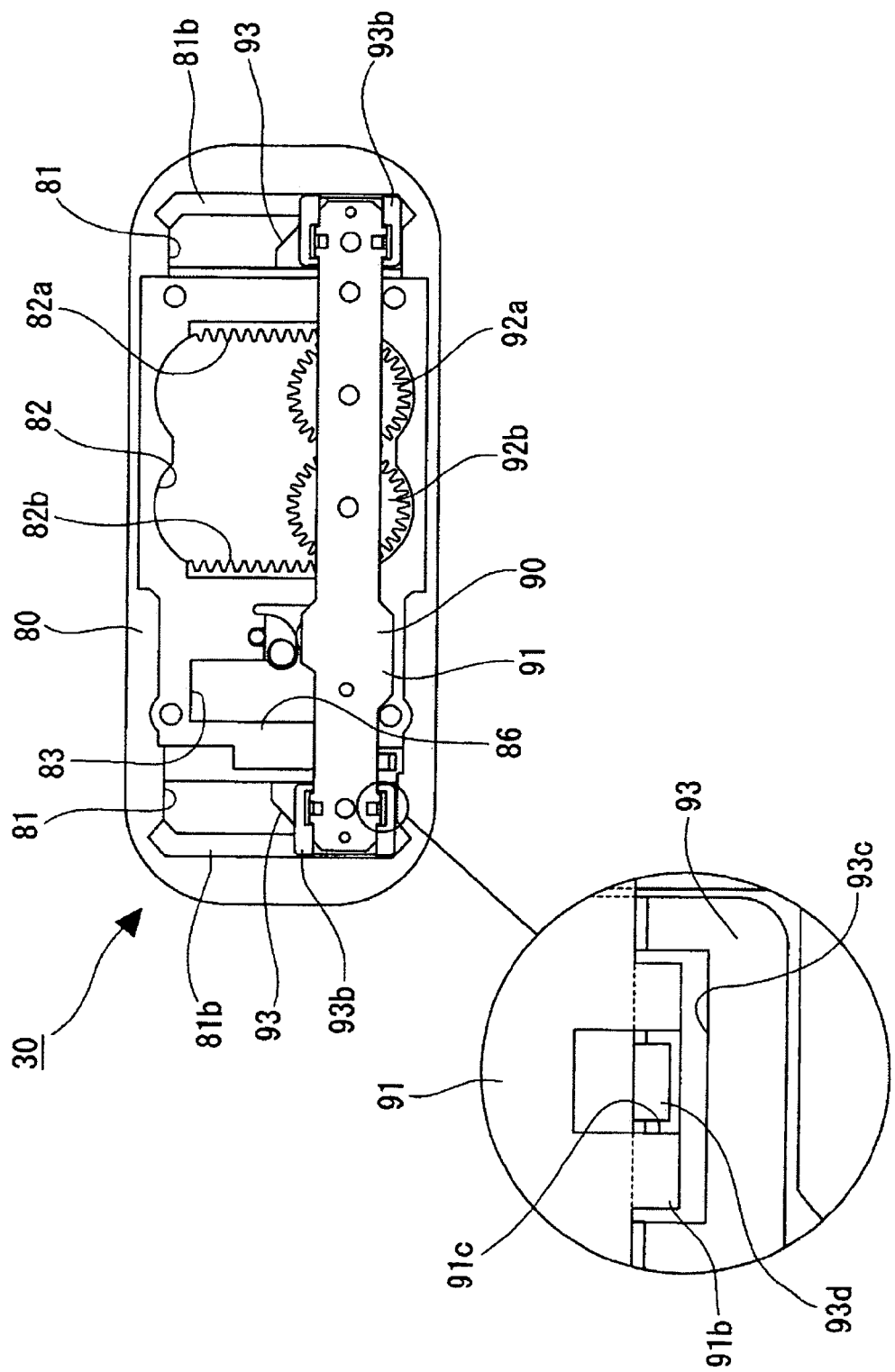

With reference to FIGS. 4 to 6, the outside plate 70 is a decorative plate facing the exterior, and is an approximate rectangle that is longer from side to side when viewed from the front. Right and left side ends 71 of the outside plate 70 are convexed toward the outside so as to form arcs. An edge line 72 convexed toward the right is formed on the outer surface of the outside plate 70 at a position adjacent to the right end, and a hollow portion 73 is formed on the left of the edge line (see FIGS. 1 and 2). The rear face of this outside plate 70 is curved to form a shallow hollow portion 74 excluding the outer rim. Such an outside plate 70 is formed by press forming with a thin metal plate, injection molding from plastic, and the like.

The structural member 80 that is rectangular when viewed from the front is slightly smaller than the outside plate 70, and is fitted in the hollow portion 74 formed in the rear face of the outside plate 70. The structural member 80 is fitted in the hollow portion 74 of the outside plate 70 so as to have a narrow space in the width direction between the outside plate 70 and the structural member 80. The outside plate 70 and the structural member 80 are fixed to each other by appropriate means such as screws or adhesives.

Guide slits 81 extending in the vertical direction and functioning as guiding portions are provided in both right and left sides of the structural member 80. Engaging fringes 81a are formed around the inner, upper, and lower edges of the guide slits 81 by slightly hollowing the rear side of the structural member 80, and moreover, engaging fringes 81b (See FIG. 6) are formed along the outer edges of the guide slits 81 by slightly hollowing the front side of the structural member 80.

A large rectangular opening 82 having racks 82a and 82b on both side edges thereof is formed at a slightly left position of the structural member 80.

A cut-out portion 83 having a reverse L-shape when viewed from the rear is disposed between the opening 82 of the structural member 80 and the guide slit 81 on the right. A supporting piece 83a protrudes downward from the upper edge of a section of the cut-out portion 83 extending leftward.

Figure 10:
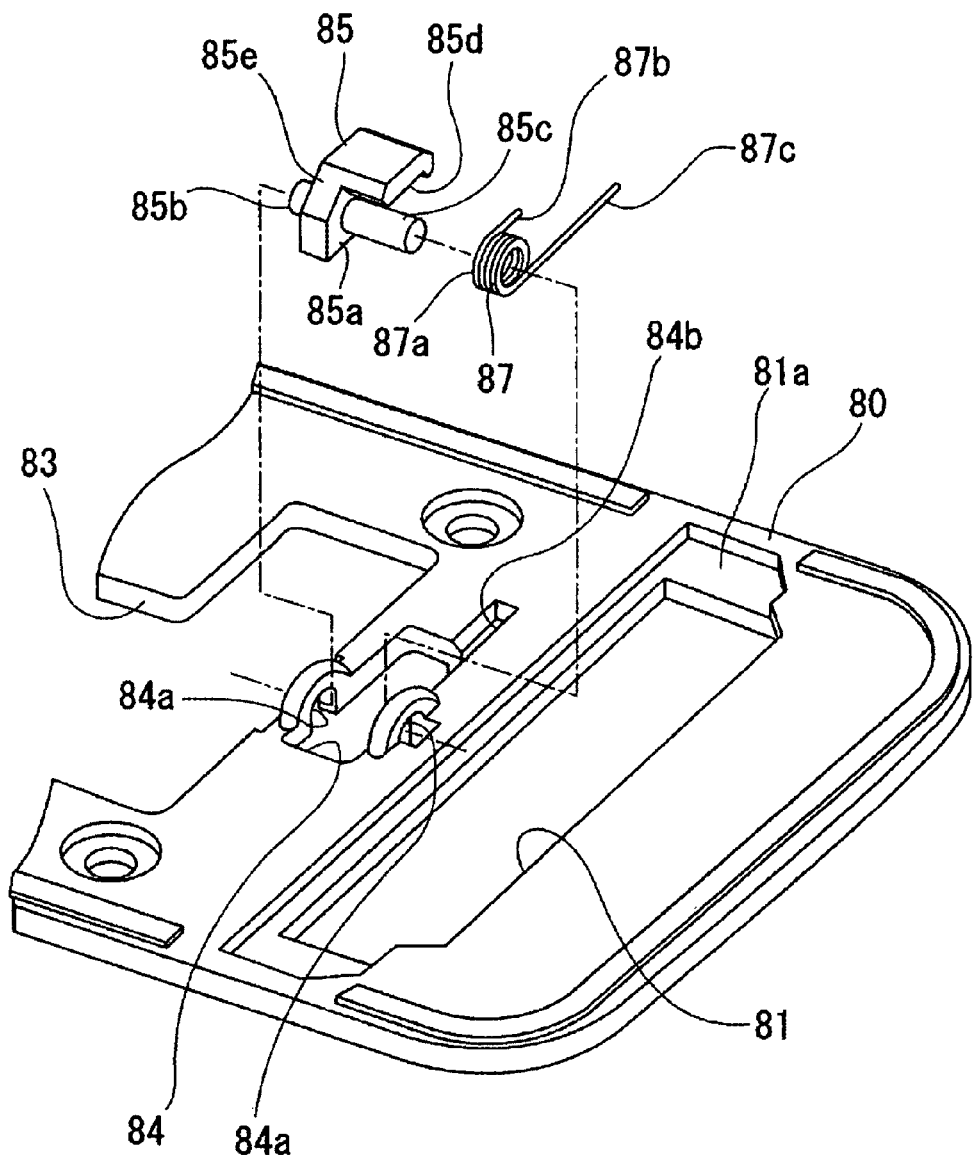

With reference to FIG. 10, a small cut-out slit 84 extending in the vertical direction is formed between the cut-out portion 83 and the guide slit 81 on the right. Slits 84a that are open to the front are formed on both sides of the cut-out slit 84 at a lower position. A slender groove 84b for engaging a spring extends upward from the upper right end of the cut-out slit 84 by hollowing the rear side of the structural member 80.

An operating projection 85 includes a main portion 85a, shafts 85b and 85c protruding from both sides of the main portion 85a, a spring abutment 85d extending upward and rightward from the rear end of the main portion 85a, and a pushing surface 85e inclining downward and rearward from the lower end of the main portion 85a. This operating projection 85 is rotatably attached to the structural member 80 by fitting the shafts 85b and 85c into the slits 84a from the front, and then by closing the front ends of the slits 84a with a covering member 86.

The operating projection 85 is biased in one direction by a helical torsion spring 87 functioning as biasing means. The shaft 85c of the operating projection 85 on the right is fitted into a coiled portion 87a of the helical torsion spring 87. A first arm 87b of the helical torsion spring 87 is resiliently in contact with the front surface of the spring abutment 85d of the operating projection 85, and a second arm 87c of the helical torsion spring 87 is disposed inside the groove 84b. The upper end of the operating projection 85 is biased to rotate rearward by this helical torsion spring 87. The rotation of the operating projection 85 in the direction the helical torsion spring 87 biases the operating projection 85 is interrupted by the contact of the front surface of the lower portion of the main portion 85a with the covering member 86. At this time, the pushing surface 85e is inclined 45° downward and rearward.

With reference to FIG. 1, the holding member 90 includes a holding plate 91, two pinions 92a and 92b meshed with each other and supported by the holding plate 91 so as to be rotatable, and guiding components 93 supported by the holding plate 91, the pinions 92a and 92b being disposed between the guiding components 93.

The holding plate 91 is a strip extending in the horizontal direction, and has a spring-hitching pierce 92a protruding rearward in a right half thereof. Supporting pieces 92b each having a supporting hole 92c protrude rearward from the upper and lower edges of both side ends of the holding plate 91. The pinions 92a and 92b meshed with each other are supported on the rear surface of the holding plate 91 at a slightly left position from the center so as to be rotatable. In addition, the guiding components 93 are supported on both side portions of the holding plate 91.

Figure 7:
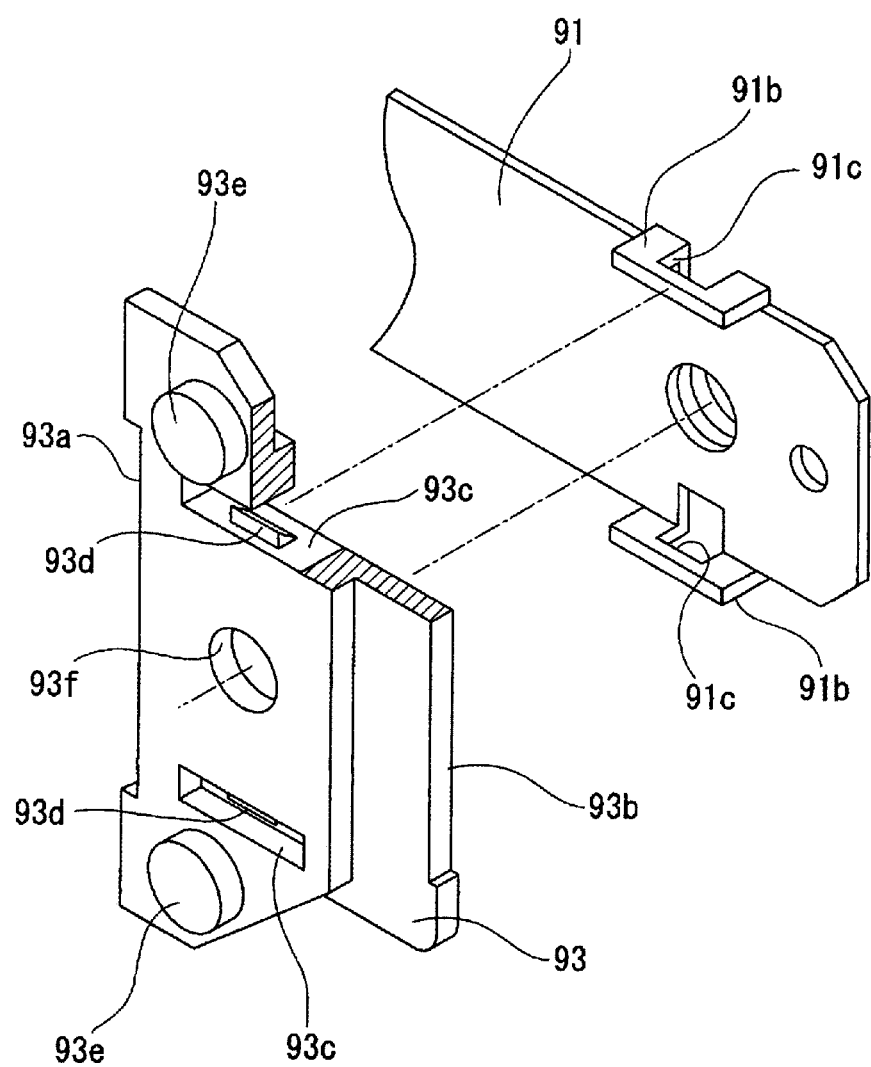

With reference to FIG. 7, the guiding components 93 each include an engaging piece 93a protruding inward, i.e. in the direction the guiding components 93 face each other, and an engaging piece 93b protruding outward, i.e. in the opposite direction. The engaging pieces 93a are disposed behind the engaging pieces 93b. Two slits 93c spaced apart therefrom are formed substantially in the central region of each guiding component 93. The upper slit 93c includes a projection 93d protruding upward from the lower surface thereof, and the lower slit 93c also includes a projection 93d protruding downward from the upper surface thereof. Positioning projections 93e are formed on the rear surface of each guiding component 93 at both the upper and lower ends. In addition, a screw hole 93f open to the rear side is formed in the central region of each guiding component 93.

The supporting pieces 92b of the holding plate 91 are fitted into the slits 93c of the guiding components 93 from the front such that the projections 93d of the guiding components 93 are engaged with the supporting holes 92c of the supporting pieces 92b (see FIG. 6). In this manner, the guiding components 93 are supported at both side portions of the holding plate 91.

With reference to FIGS. 5 and 6, the holding member 90 having the above-described structure is supported on the structural member 80 so as to be vertically movable by disposing the holding plate 91 between the outside plate 70 and the structural member 80, by engaging the engaging pieces 93a of the guiding components 93 with the engaging fringes 81a on the inner sides of the guide slits 81 of the structural member 80 from the rear (see FIG. 5), and by engaging the engaging pieces 93b with the engaging fringes 81b on the outer sides of the guide slits 81 from the front (see FIG. 6) such that the guiding components 93 are fitted in the guide slits 81 of the structural member 80. Furthermore, the pinion 92a is meshed with the rack 82a of the structural member 80, and the pinion 92b is meshed with the rack 82b of the structural member 80.

The toggling spring 100 functioning as toggling means includes a coiled portion 101, and two arms, i.e. a first arm 102 and a second arm 103, protruding so as to form a V-shape. The end of the first arm 102 is supported by the supporting piece 83a of the structural member 80, and the second arm 103 is supported by the spring-hitching pierce 92a of the holding plate 91.

The sliding cover 30 having the above-described structure is attached to the body 20 as follows.

The sliding cover 30 is supported on the front surface of the front case 50 of the body 20. The front case 50 is formed by press forming with a metal plate such as stainless steel, injection molding from plastic, and the like. The front case 50 includes a front face 50a, left and right faces 50b protruding rearward from both left and right edges of the front face 50a, and upper and lower faces 50c and 50d protruding rearward from both upper and lower edges of the front face 50a. The front face 50a includes the above-described opening 51 for the lens, the beam-emitting port 52, and an opening 53 through which the strobe 24 faces forward. The front face 50a further includes screw holes 54 on both sides at slightly upper positions from the center in the vertical direction, and positioning holes 55 disposed above and below these screw holes 54. In addition, a slightly larger rectangular opening 56 is formed adjacent to the screw hole 54 on the right (see FIG. 5).

The positioning projections 93e of the guiding components 93 of the sliding cover 30 are fitted into the positioning holes 55 of the front case 50 of the body 20 from the front. In this manner, the guiding components 93 are positioned with respect to the front case 50, and the screw holes 93f of the guiding components 93 are disposed in front of the screw holes 54 of the front case 50. Screws 93g are then inserted into the screw holes 54 from inside and screwed into the screw holes 93f of the guiding components 93. As a result, the guiding components 93 are fixed to the front case 50 of the body 20. The guiding components 93 are parts of the assembled holding member 90, and the holding member 90 is linked to the outside plate 70 and the structural member 80 so as to be movable with respect to each other in the above-described manner. Accordingly, the outside plate 70 and the structural member 80 are supported on the front case 50 so as to be vertically movable through the guiding components 93 and thus through the holding member 90 fixed to the front case 50 of the body 20. The front case 50 is then assembled with other members to form the casing 40, and the body 20 is formed by arranging required components and members in the casing 40. Thus, as is described with reference to FIGS. 1 to 3, the sliding cover 30 is disposed on the front surface 20a of the body 20 such that the state of the sliding cover 30 can be changed between the closed state shown in FIG. 1 and the open state shown in FIG. 2.

Figure 8:
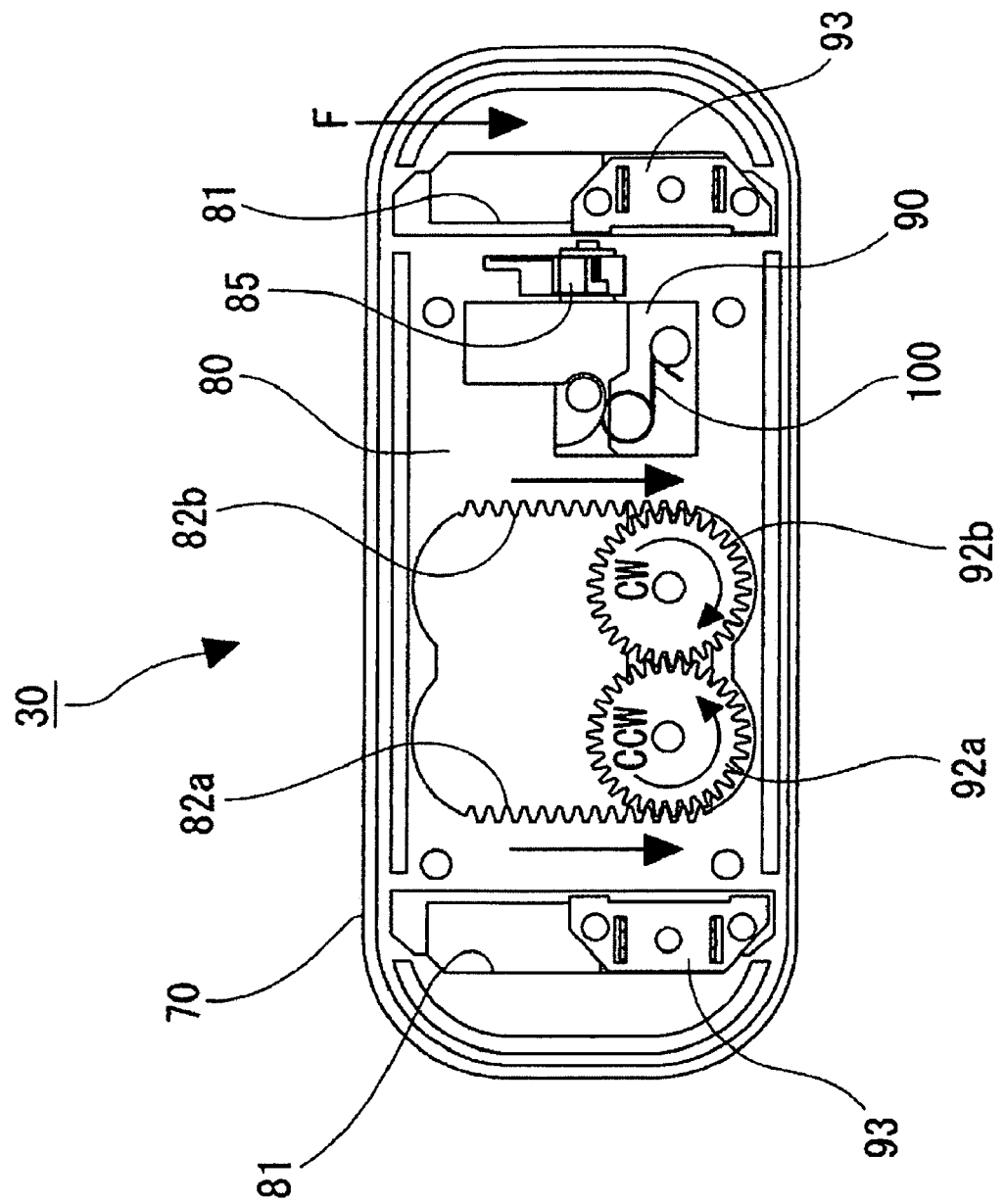
Figure 9:
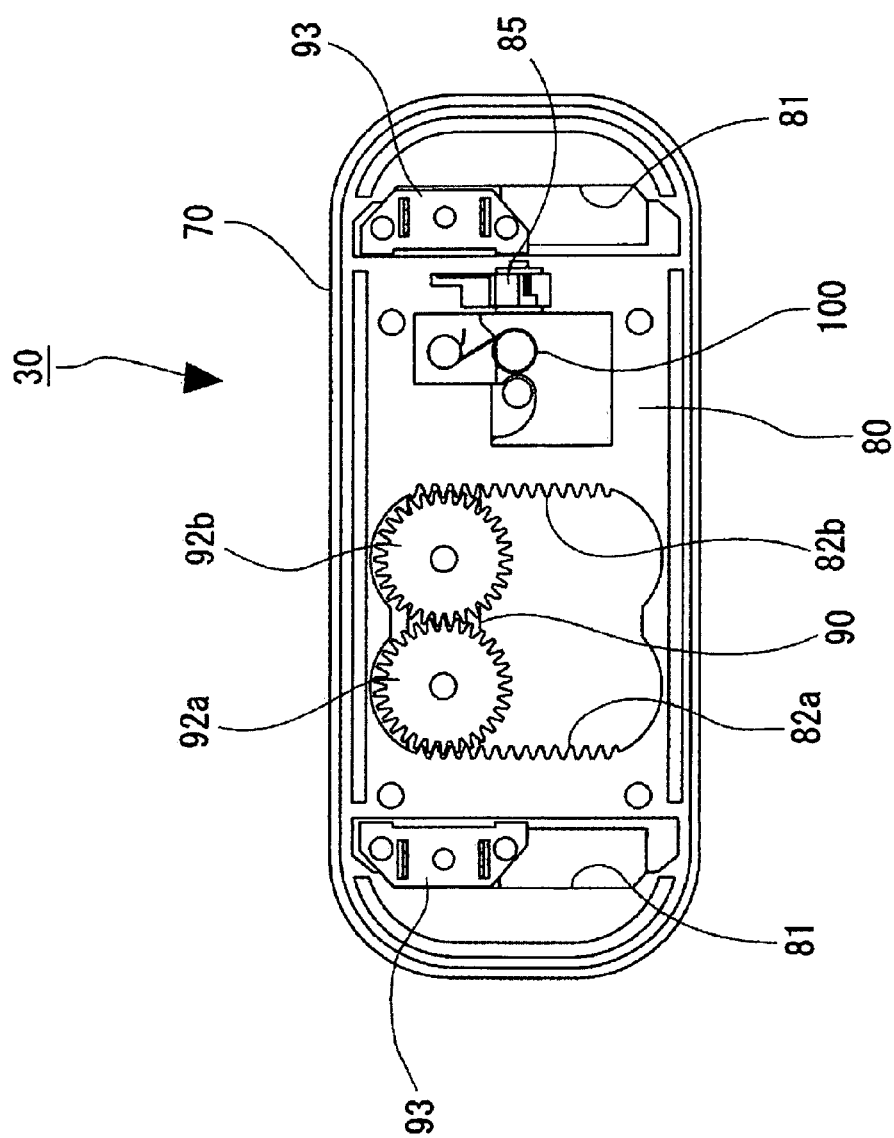

FIG. 8 is a rear view of the sliding cover 30 in the closed state, and FIG. 9 is a rear view of the sliding cover 30 in the open state.

When the sliding cover 30 is in the closed state as shown in FIG. 8, the guiding components 93 of the holding member 90 are disposed at the lowest ends of the guide slits 81 of the structural member 80, and the two pinions 92a and 92b are meshed with the lowest portions of the racks 82a and 82b, respectively. In this state, the resilient force is generated by the toggling means (toggling spring) 100 such that the ends of the arms 102 and 103 are separated from each other, and acts on the holding member 90 such that the outside plate 70 and the structural member 80 are pushed upward. In this manner, the sliding cover 30 is retained in the closed state where the outside plate 70 (and the structural member 80) is disposed in the closed position.

When a force is applied to move the outside plate 70 (and the structural member 80) of the sliding cover 30 to the open position (when an operator is right-handed, the force is normally applied to the upper right portion of the outside plate 70 in the direction of an arrow F shown in FIG. 8), the outside plate 70 and the structural member 80 move downward with respect to the holding member 90. At this time, a downward motion is first shown at the right rack 82b adjacent to the point of application (the portion where the force is applied in the direction of the arrow F), and the pinion 92b meshed with the rack 82b starts rotating in the clockwise direction (see an arrow CW in FIG. 8). Therefore, the left pinion 92a meshed with the pinion 92b starts rotating in the counterclockwise direction (see an arrow CCW in FIG. 8), and the downward force acts on the left rack 82b since the pinion 92a is meshed with the rack 82b. In this manner, the downward moving force evenly acts on the outside plate 70 and the structural member 80 both on the left and right sides, and thus the outside plate 70 and the structural member 80 smoothly move downward, i.e. to the open position.

When the outside plate 70 and the structural member 80 move from the closed position to the open position and pass through the approximate midpoint in the movable range, the direction of the toggling means 100 is reversed, and the direction of the resilient force generated such that the ends of the arms 102 and 103 are separated from each other is changed from upward to downward. Thus, the outside plate 70 and the structural member 80 are urged downward, i.e. to the open position. When the outside plate 70 and the structural member 80 reach the open position, the sliding cover 30 is retained in the open state where the outside plate 70 and the structural member 80 are disposed in the open position by the urging force of the toggling means 100.

The same applies to the situation when the outside plate 70 and the structural member 80 move to the closed position (the directions of the arrows shown in FIG. 8 are reversed), and the outside plate 70 and the structural member 80 smoothly move upward.

Transfer of sliding covers causes changes in states of electronic devices having the sliding covers. For example, opening of the sliding covers causes a usable state, and closing of the sliding covers causes an unusable state. Therefore, if the electronic devices become ready and available at the opening of the sliding covers, the usability of the devices is improved compared with cases where some procedures, for example, turning on the power after the opening of the sliding covers, are required to use the devices.

For the above-described digital camera 10, the imaging lens 23 and the strobe 24 only face forward when the sliding cover 30 is open, and some operations such as turning on the power are required to take pictures. Therefore, it is preferable that the power be turned on and preparations for taking pictures be made when the sliding cover 30 is open, while the power be turned off and the ready state for taking pictures be canceled when the sliding cover 30 is closed. To meet this need, the sliding cover 30 includes the operating projection 85 described as above. The actions of the operating projection 85 will now be described.

Figure 11:
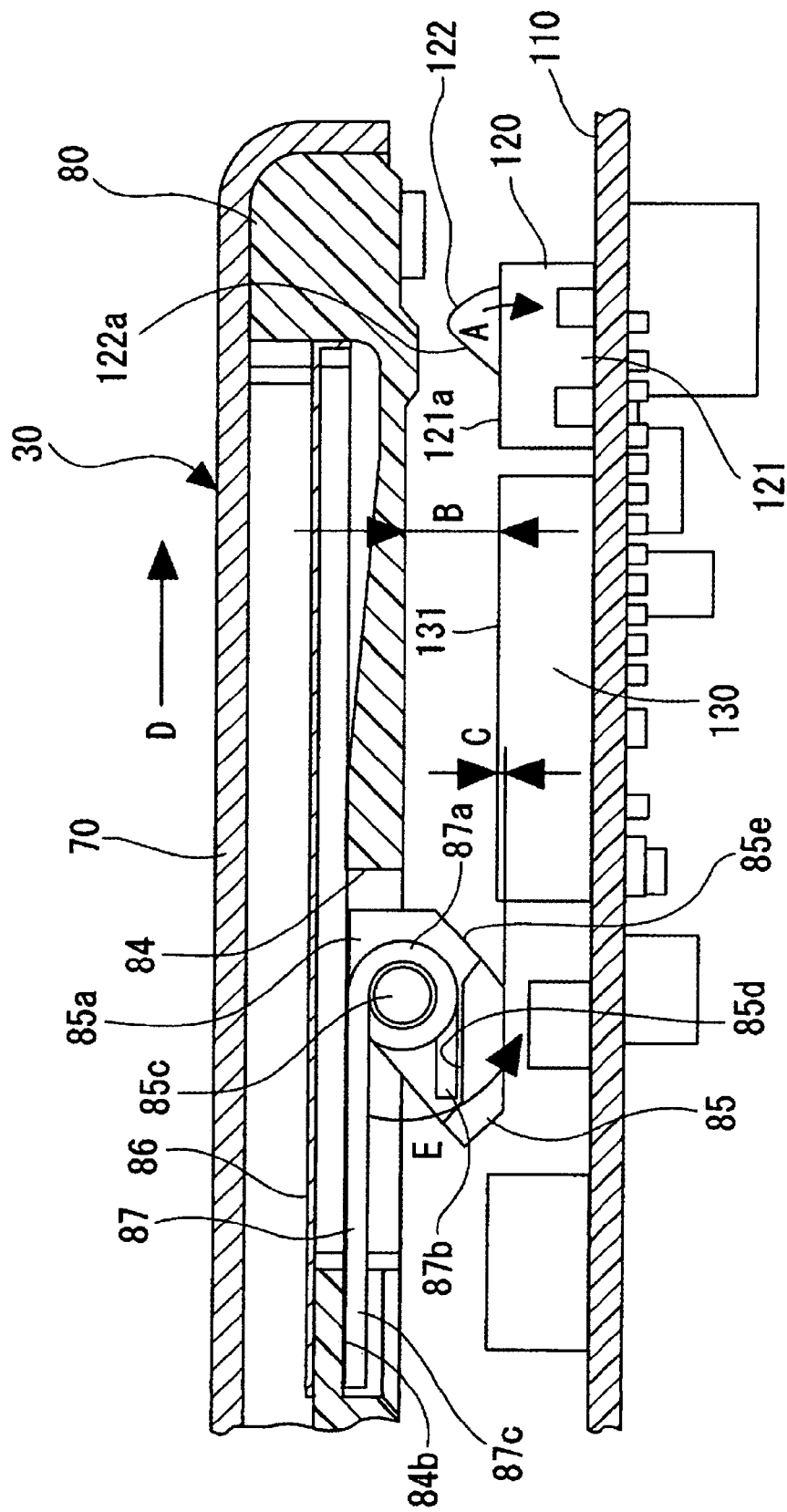

The state of the sliding cover 30 is detected by a detecting switch operated by the operating projection 85. As shown in FIG. 11, a detecting switch 120 is attached to the surface of a substrate 110 disposed in the body 20, the surface opposing the sliding cover 30. The detecting switch 120 includes a casing 121 containing required members and components, and an operation-receiving piece 122 protruding forward from the lower end of the front surface of the casing 121. The operation-receiving piece 122 can be moved downward and upward the casing 121, and is normally retained at the position shown in FIG. 11 by resilient means (not shown) disposed in the casing 121. The operation-receiving piece 122 includes a pressure-receiving surface 122a inclined substantially 45° upward and forward. When the pressure-receiving surface 122a is pushed from the top or the front, the operation-receiving piece 122 rotates in the direction of an arrow A shown in FIG. 11 and is retracted into the casing 121. When an operation is performed to retract the operation-receiving piece 122 into the casing 121, the power is turned on, and each section in the body 20 becomes ready for taking pictures.

FIG. 11 illustrates a state when a clearance B between the sliding cover 30 and the detecting switch 120 is normal. The trailing end of the pushing surface 85e of the operating projection 85 is located behind the front surface 121a of the casing 121 of the detecting switch 110 with a distance C. The operating projection 85 is biased in the direction of an arrow E shown in FIG. 11 by the helical torsion spring 87.

Figure 12:
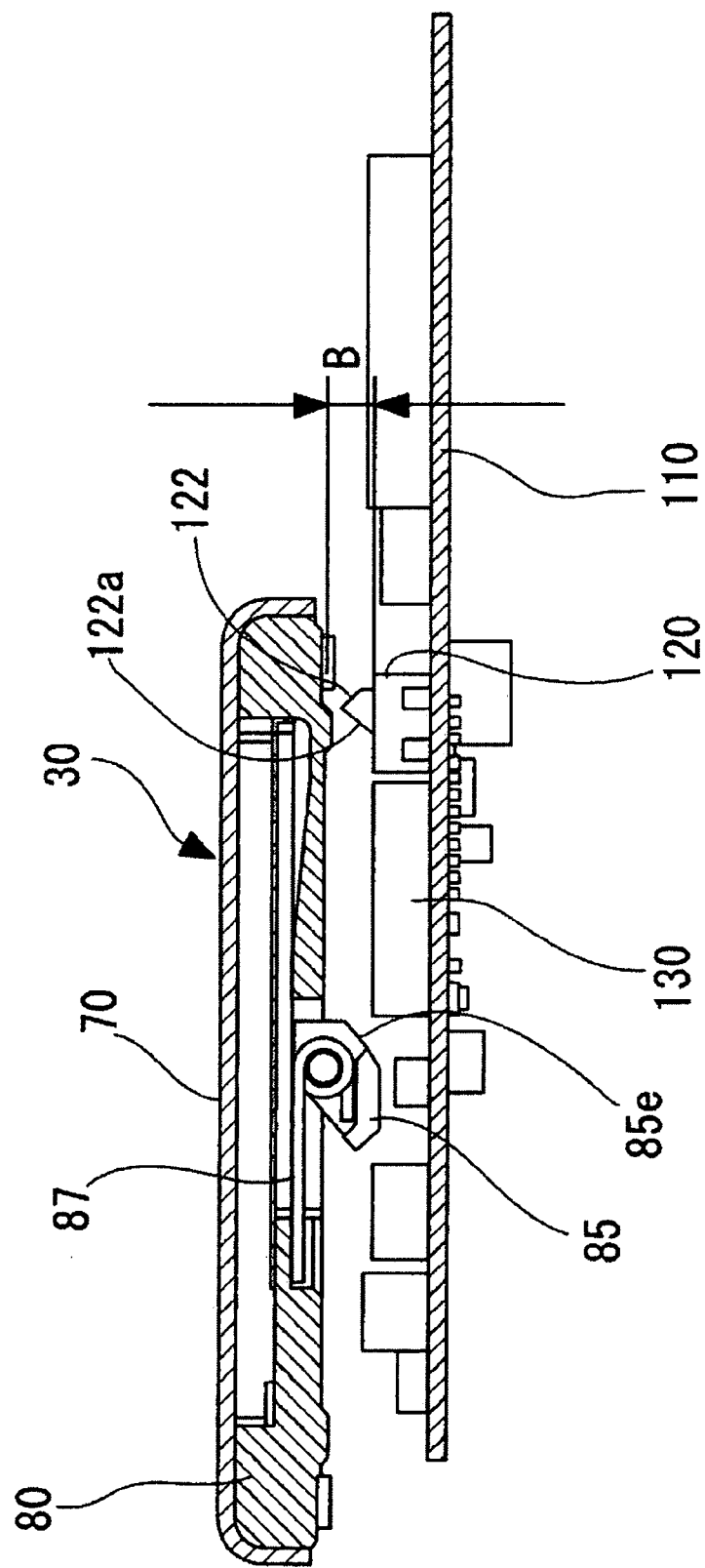
Figure 13:
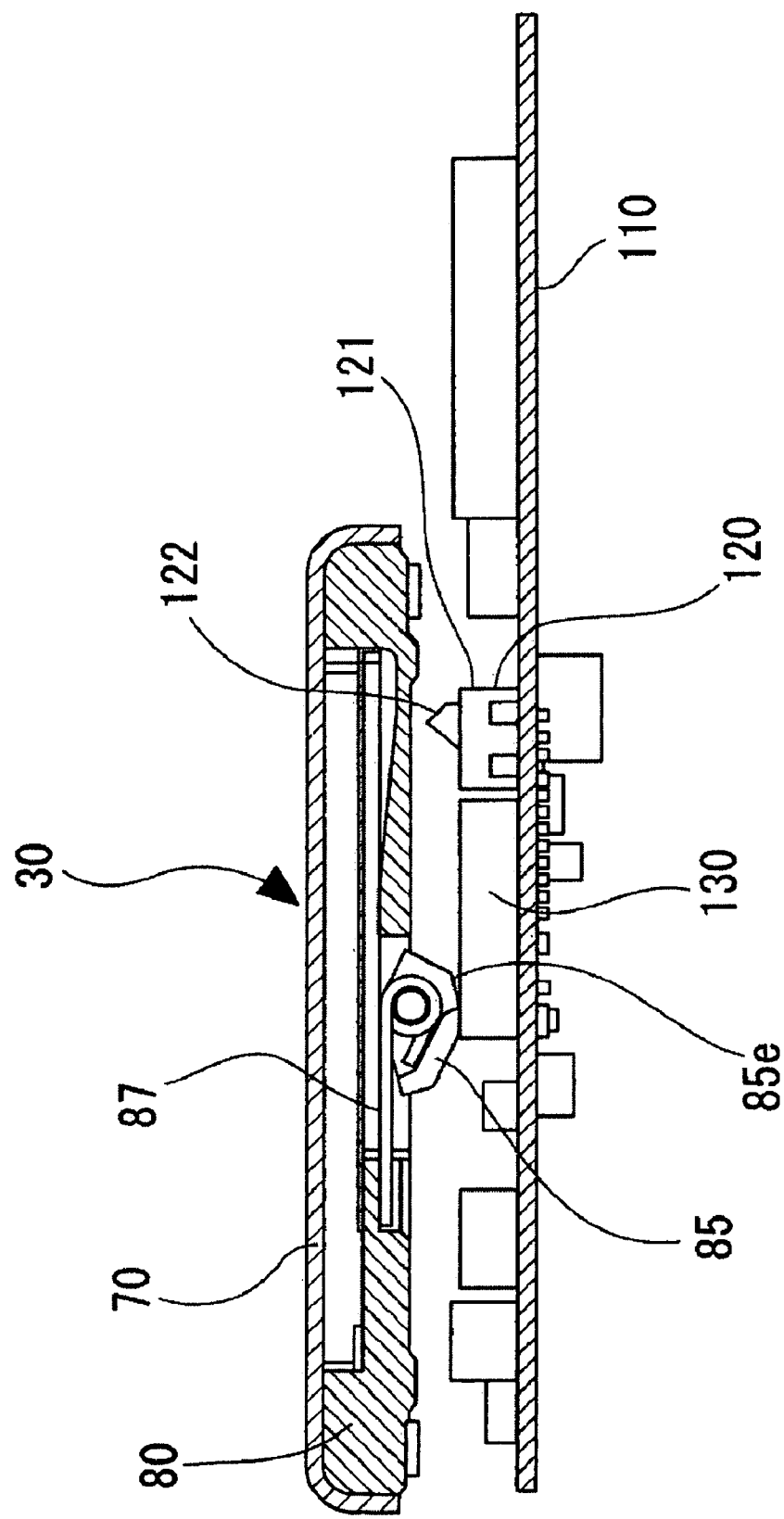
Figure 14:
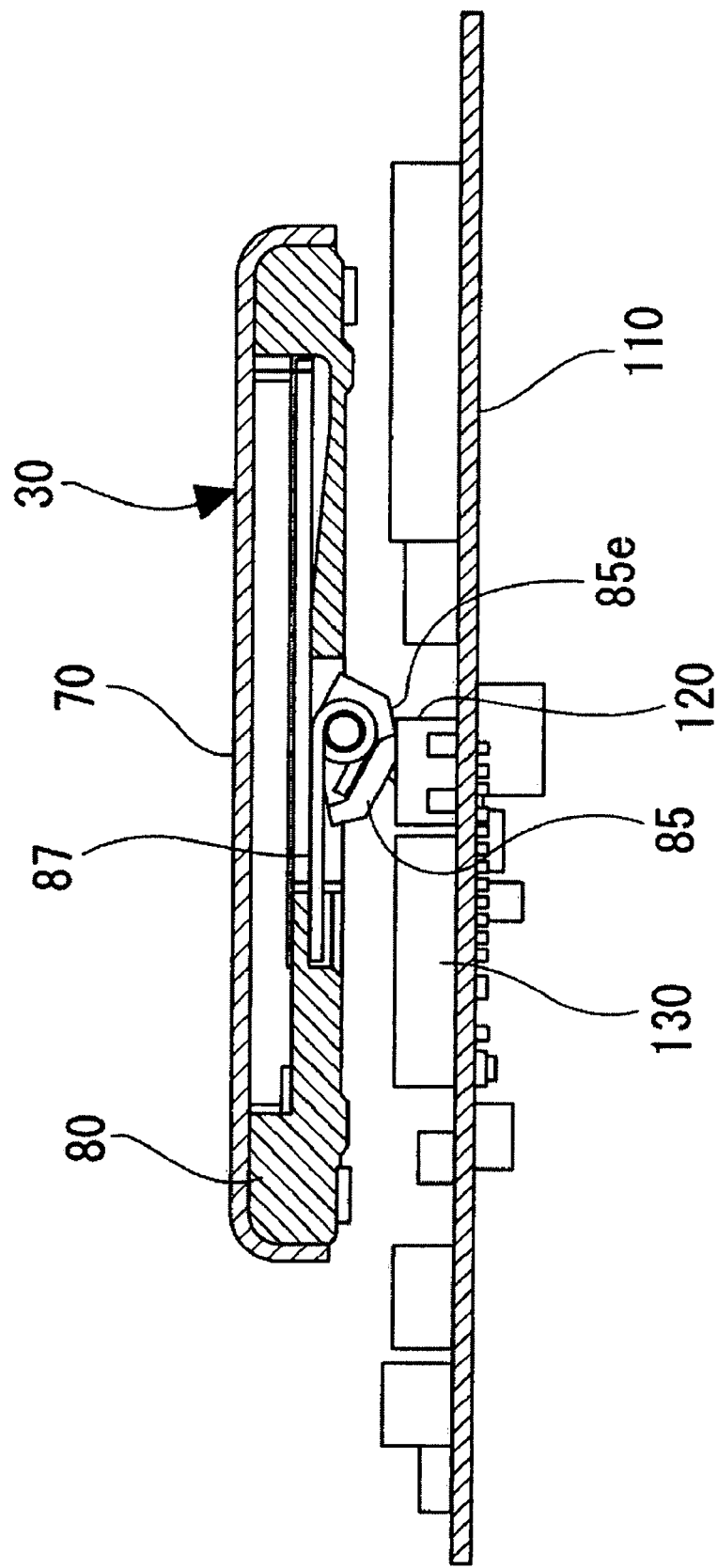

FIGS. 12 to 14 illustrate how the operating projection 85 operates the detecting switch 120 when the clearance B between the sliding cover 30 and the detecting switch 120 is normal.

FIG. 12 illustrates the sliding cover 30 in the closed state, i.e. the outside plate 70 and the structural member 80 are in the closed position. From this state, the outside plate 70 and the structural member 80 start moving to the open position, i.e. in the direction of an arrow D shown in the drawing, and then the trailing end of the pushing surface 85e of the operating projection 85 immediately comes into contact with a guide mount 130 mounted on the substrate 110 immediately upstream of the detecting switch 120. The front surface 131 of the guide mount 130 herein is located in the same plane as the front surface 121a of the detecting switch 120. When the outside plate 70 and the structural member 80 further move in the direction of the arrow D, the operating projection 85 rotates in the opposite direction of the arrow E shown in FIG. 11 against the biasing force of the helical torsion spring 87, and the trailing end of the operating projection 85 slides on the front surface 131 of the guide mount 130 (see FIG. 13). When the outside plate 70 and the structural member 80 further move in the direction of the arrow D, the pushing surface 85e of the operating projection 85 comes into contact with the pressure-receiving surface 122a of the operation-receiving piece 122 of the detecting switch 120. Since the pushing surface 85e further pushes the pressure-receiving surface 122a in the direction of the arrow D shown in FIG. 11, the operation-receiving piece 122 rotates in the direction of the arrow A shown in FIG. 11 and is pushed into the casing 121 (see FIG. 14). As a result, the power is turned on, and preparations for taking pictures are made.

When the sliding cover 30 shifts from the open state to the closed state, the state shown in FIG. 14 changes to that shown in FIG. 12, and the above-described operations proceed in the opposite direction. Thus, the operation-receiving piece 122 of the detecting switch 120 protrudes forward from the casing 121 by the resilient means (not shown), and the power is cut off.

Next, the operations when there are some variations in the components and the assembling accuracy will now be described.

Figure 15:
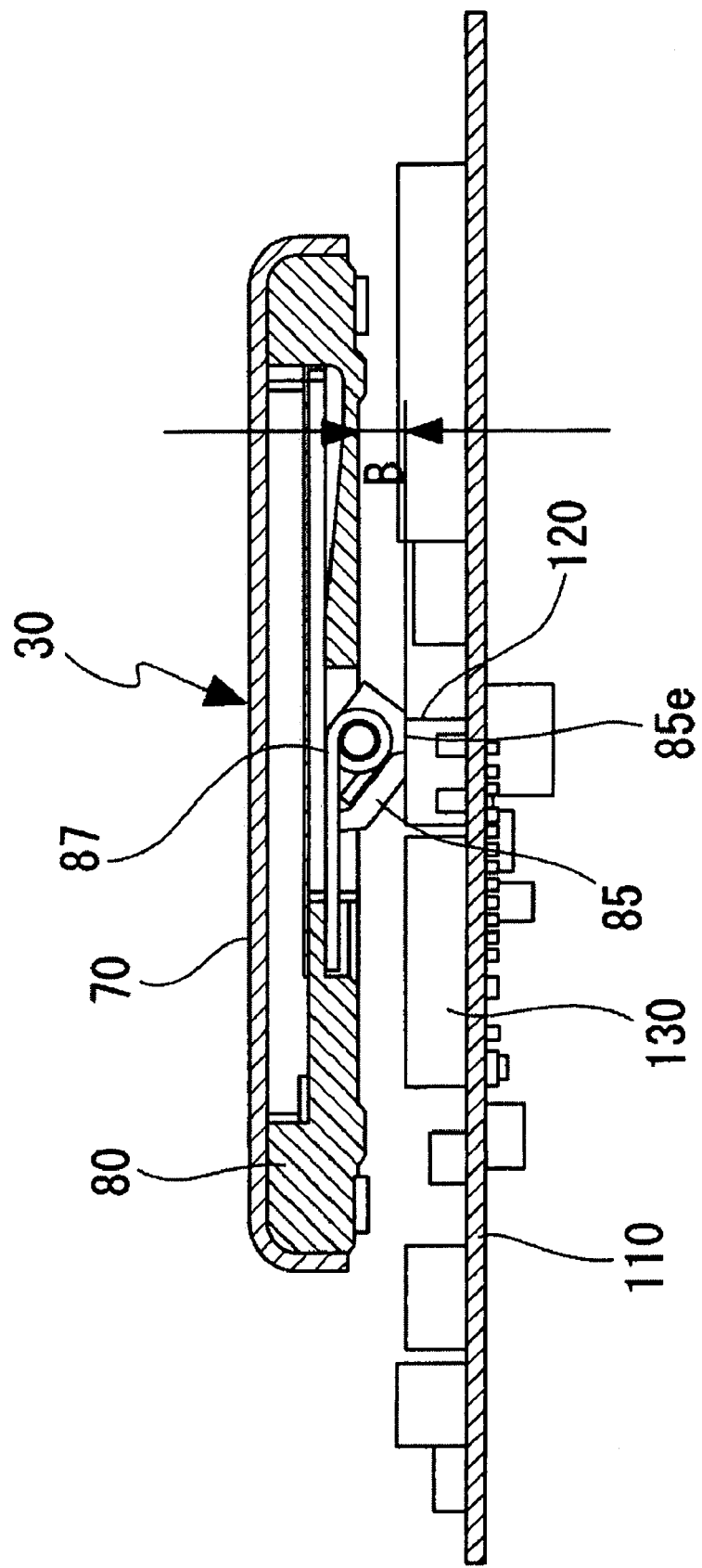

FIG. 15 illustrates a state when the detecting switch 120 is mounted on the substrate 110 with a small spacing therebetween, or when the clearance B between the operating projection 85 and the detecting switch 120 is smaller than expected during assembling. In this case, as shown in FIG. 15, when the operating projection 85 comes into contact with the casing 121 of the detecting switch 120, the operating projection 85 further rotates in the opposite direction of the arrow E shown in FIG. 11 than the case shown in FIG. 13 so as to absorb the above-described dimensional error. Accordingly, the trailing end of the operating projection 85 comes into contact with and slides on the front surface of the casing 121, and the pushing surface 85e of the operating projection 85 can push the pressure-receiving surface 122a of the operation-receiving piece 122 of the detecting switch 120 without any problems.

Figure 16:
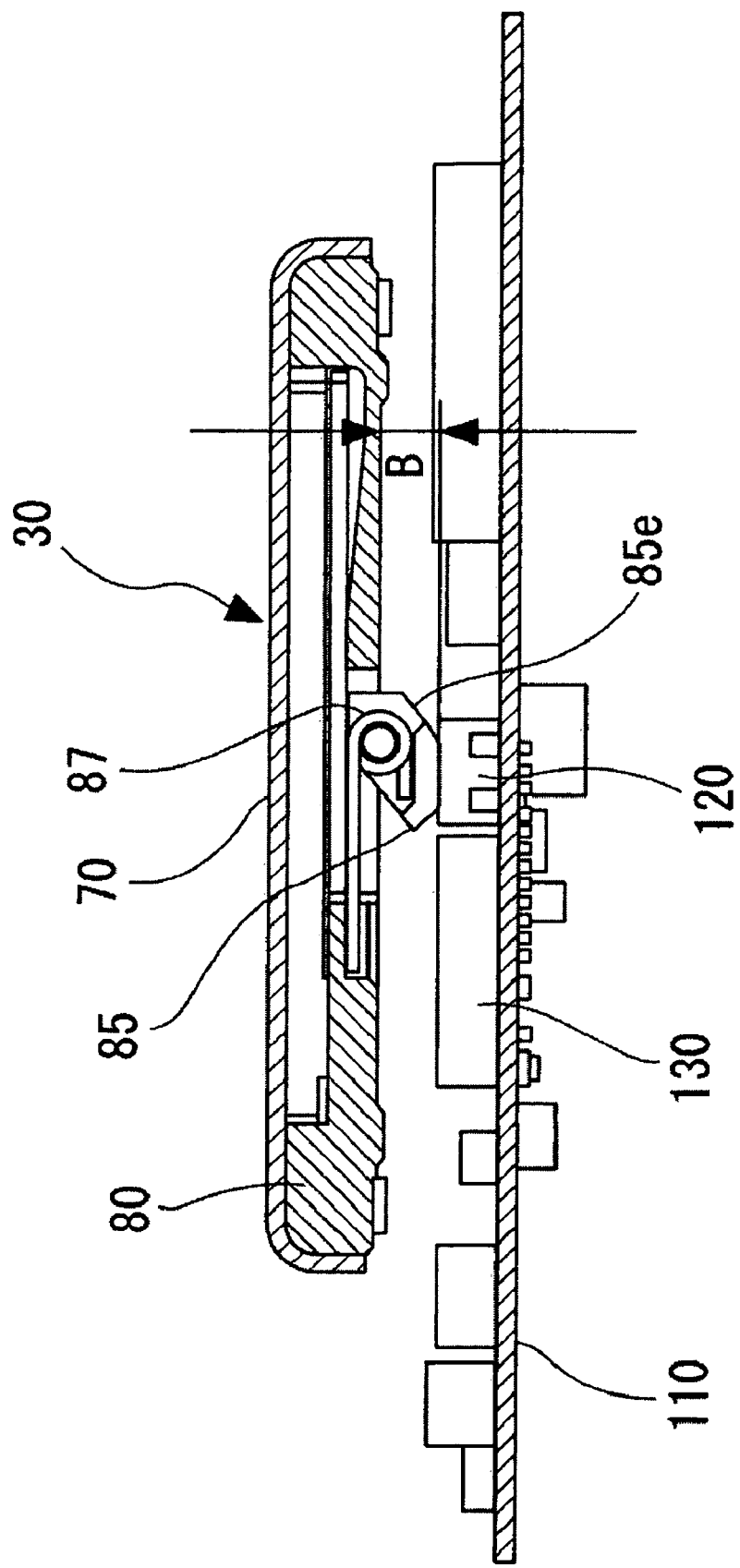

Contrary to the case shown in FIG. 15, FIG. 16 illustrates a state when the clearance B between the operating projection 85 and the detecting switch 120 is larger than the case shown in FIG. 11. As described above, when the clearance B between the operating projection 85 and the detecting switch 120 is small, the operating projection 85 rotates in the opposite direction of the arrow E shown in FIG. 11 against the biasing force of the helical torsion spring 87 to compensate for the small clearance B. Accordingly, the operating projection 85 can be preliminarily disposed so as to protrude toward the body 20 by a somewhat larger amount. Therefore, even in the case shown in FIG. 16, the operating projection 85 can reliably push the operation-receiving piece 122 of the detecting switch 120 without failure.

Size reduction and slimming of electronic devices have been remarkable in the past year, and will continue over the coming years. In this respect, digital cameras are also no exception. In response to the promotion of size reduction and slimming of the electronic devices, the detecting switch is also required to be slim, and the space accommodating the switch is also required to be small. As such slimming and size reduction are promoted, the movable range of the operating projection for operating the detecting switch in response to the motion of the sliding cover or the clearance between the operating projection and the detecting switch are also required to be small. As a result, there is the possibility that the sliding cover cannot move or the operating projection cannot reliably push the detecting switch due to small errors in the component dimensions or the assembling accuracy.

Meanwhile, in the above-described digital camera 10, the operating projection 85 can rotate in response to the motion of the sliding cover 30, and the operating projection 85 is resiliently biased in the direction along which the operating projection 85 pushes the operation-receiving piece 122 of the detecting switch 120. Accordingly, even when the above-described clearance is large, the operating projection 85 can successfully push the operation-receiving piece 122 of the detecting switch 120 by disposing the operating projection 85 so as to protrude toward the detecting switch 120 by a somewhat larger amount. On the other hand, even when the clearance is small, the operating projection 85 can rotate against the biasing force and can prevent problems such as the blocking of the operation of the sliding cover 30 or damage of the operating projection 85, the detecting switch 120, and the like.

Figure 17:
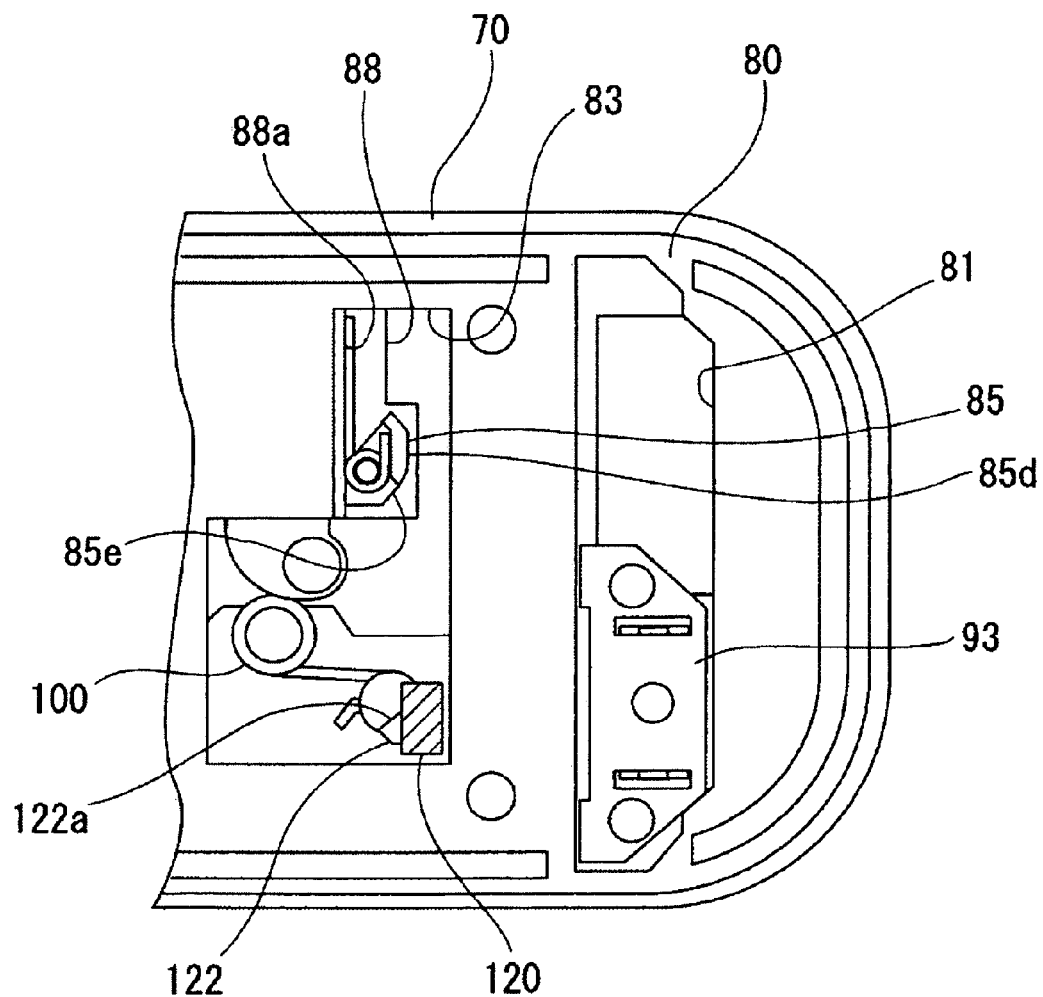

FIG. 17 illustrates a modification in the arrangement of an operating projection 85 and a detecting switch 120.

In FIG. 17, a mount piece 88 protrudes downward from the top end of a cut-out portion 83 of a structural member 80, a cut-out portion 88a that opens rightward and downward is formed on the right side of the mount piece 88, and the operating projection 85 having the same shape described as above is disposed inside the cut-out portion 88a so as to be rotatable. A shaft 85c of the operating projection 85 is fitted into a coiled portion 87a of a helical torsion spring 87. A first arm 87b of the helical torsion spring 87 is resiliently in contact with a spring abutment 85d of the operating projection 85, and a second arm 87c is resiliently in contact with the inner left surface of the cut-out portion 88a. Thus, the operating projection 85 is biased in the clockwise direction in FIG. 17

(see an arrow CW in the drawing) by the helical torsion spring 87. Therefore, the clockwise rotation of the operating projection 85 is interrupted by the contact of a main portion 85a with the inner left surface of the cut-out portion 88a, and the operating projection 85 is retained in the state shown in FIG. 17.

The detecting switch 120 is mounted on a substrate disposed inside a body 20 such that an operation-receiving piece 122 protrudes leftward from a casing 121, and that a pressure-receiving surface 122a of the operation-receiving piece 122 opposes a pushing surface 85e of the operating projection 85 from the lower position.

With this structure shown in FIG. 17, the components similarly function as above. That is to say, even when a clearance B between the operating projection 85 and the detecting switch 120 is large, the operating projection 85 can successfully push the operation-receiving piece 122 of the detecting switch 120 by disposing the operating projection 85 so as to protrude toward the detecting switch 120 by a somewhat larger amount. On the other hand, even when the clearance is small, the operating projection 85 can rotate against the biasing force of the helical torsion spring 87 and can prevent problems such as the blocking of the operation of a sliding cover 30 or damage of the operating projection 85, the detecting switch 120, and the like.

Figure 18:
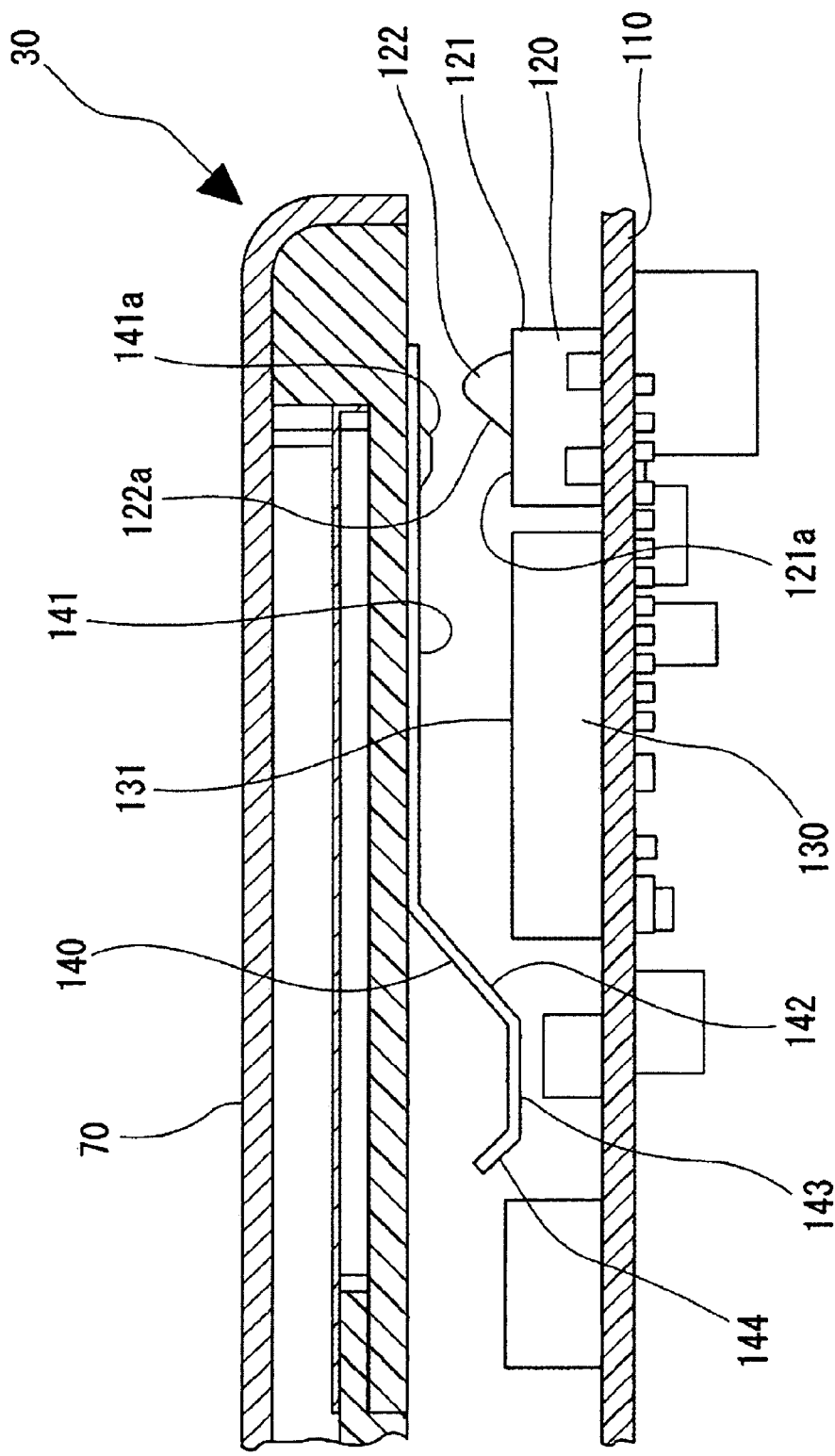

The operating projection can be carried out with an embodiment (a modification) shown in FIG. 18.

An operating projection 140 is a bent oblong plate spring, and consists of a mounting section 141, a pushing surface 142, a sliding surface 143, and an auxiliary section 144. The mounting section 141 is fixed to a structural member 80 of a sliding cover 30 with a screw 141a. The pushing surface 142 protrudes rearward and upward by approximately 45° from the top end of the mounting section 141. In addition, the sliding surface 143 extends upward from the top end of the pushing surface 142. Finally, the auxiliary section 144 obliquely protrudes forward and upward from the top end of the sliding surface 143.

With the above-described operating projection 140, an operation-receiving piece 122 of a detecting switch 120 can be reliably operated since the operating projection 140 formed of the plate spring can compensate for small variations in the clearance between the operating projection 140 and the detecting switch 120 caused by dimensional errors of components or assembling accuracy. That is to say, even when the above-described clearance is large, the operating projection 140 can successfully push the operation-receiving piece 122 of the detecting switch 120 by disposing the operating projection 140 so as to protrude toward the detecting switch 120 by a somewhat larger amount. On the other hand, even when the clearance is small, the operating projection 140 can bend due to the resilience of the plate spring, and can prevent problems such as the blocking of the operation of the sliding cover 30 or damage of the operating projection 140, the detecting switch 120, and the like.

Figure 19:
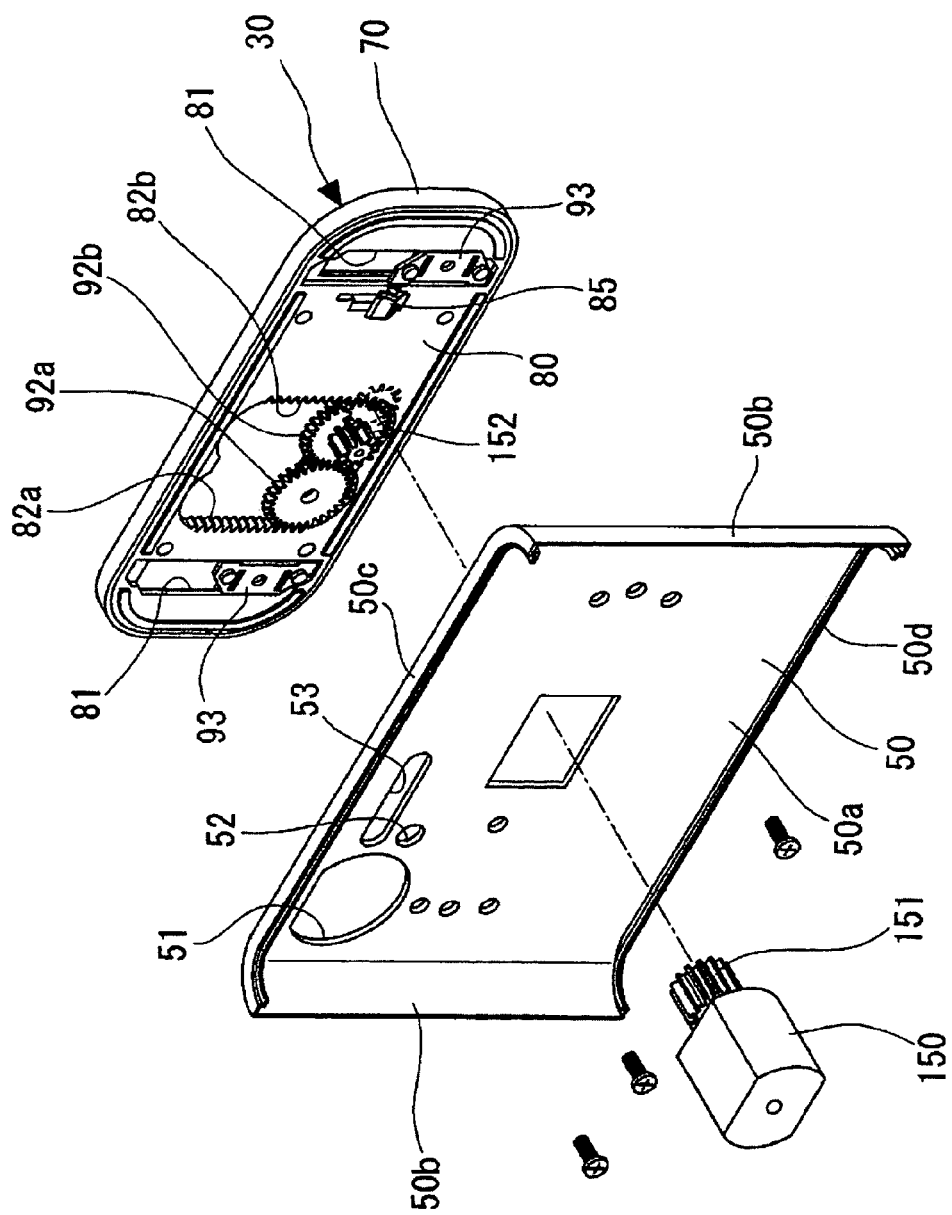
FIG. 19 is an exploded perspective view of an essential portion schematically illustrating a second embodiment.

FIG. 19 illustrates a second embodiment of the present invention. A motor such as a direct-current (DC) motor 150 that is rotatable forward and backward is disposed inside a body 20, and a driving gear 151 is fixed to an output shaft of the DC motor 150. A small gear 152 that has a smaller diameter than that of a pinion 92b, which is one of the above-described pinions, of a sliding cover 30 and that is coaxial with the pinion 92b is integrated on the pinion 92b. The driving gear 151 and the small gear 152 are meshed with each other when the sliding cover 30 is attached to the body 20.

When an outside plate 70 and a structural member 80 slightly move from the closed state of the sliding cover 30 toward the open position, a sensor (not shown) detects it and rotates the DC motor 150 in one direction. Therefore, the pinion 92b is rotated in the clockwise direction via the two gears 151 and 152, and a pinion 92a meshed with the pinion 92b is rotated in the counterclockwise direction. Thus, the pinions 92a and 92b feed racks 82a and 82b, respectively, and the outside plate 70 and the structural member 80 automatically move toward the open position. When the outside plate 70 and the structural member 80 reach the open position, i.e. in the open state of the sliding cover 30, the sensor (not shown) detects it and stops the motor.

When the outside plate 70 and the structural member 80 slightly move from the open state of the sliding cover 30 toward the closed position, the sensor (not shown) detects it and rotates the DC motor 150 in the other direction. Therefore, the pinion 92b is rotated in the counterclockwise direction via the two gears 151 and 152, and the pinion 92a meshed with the pinion 92b is rotated in the clockwise direction. Thus, the pinions 92a and 92b feed the racks 82a and 82b, respectively, and the outside plate 70 and the structural member 80 automatically move toward the closed position. When the outside plate 70 and the structural member 80 reach the closed position, i.e. in the closed state of the sliding cover 30, the sensor (not shown) detects it and stops the motor.

Toggling means 100 is not required in this second embodiment.

Figure 20:
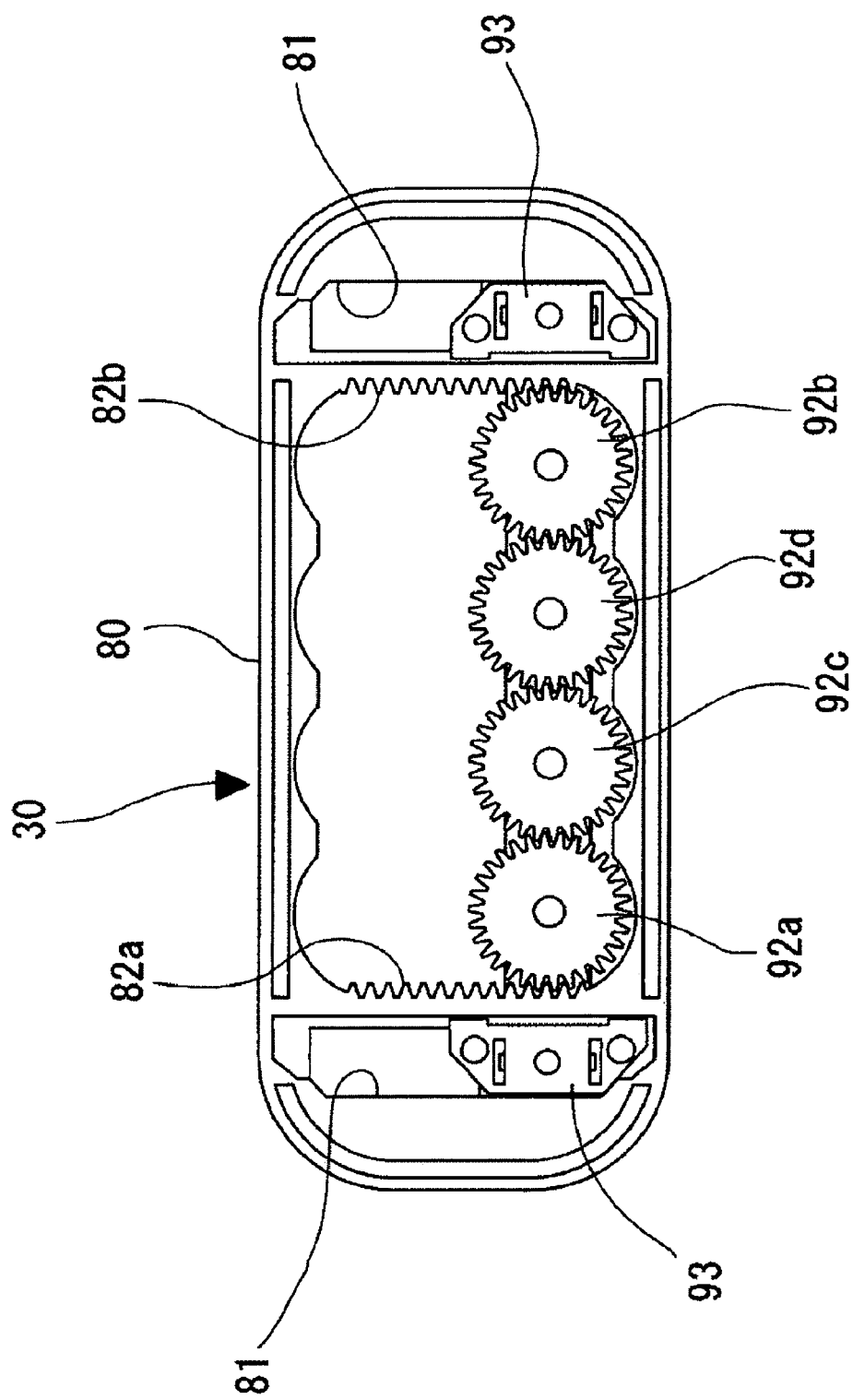
FIG. 20 is a rear view of a sliding cover according to a third embodiment.

FIG. 20 illustrates a sliding cover according to a third embodiment of the present invention.

In a sliding cover 30 according to this third embodiment, two intermediate pinions 92c and 92d are interposed between pinions 92a and 92b that are meshed with racks 82a and 82b on the left and the right, respectively.

Even when the sliding cover 30 is particularly long in one direction, and moves in the direction orthogonal to the longitudinal direction, the sliding cover 30 can smoothly move without leaning to one side since the moving force is applied to the racks 82a and 82b at portions adjacent to both ends.

In the above-described embodiments, the electronic devices of the present invention are applied to digital cameras. However, the electronic devices of the present invention are not limited to digital cameras, and are also applicable to various electronic devices that require sliding covers.

Moreover, the operating projections attached to the sliding covers operate the switches. However, the operating projections can operate not only the switches but also various members or components for, for example, unloading recording media.

In addition, the specific profiles and the structures of the components shown in the above-described preferred embodiments are merely examples for carrying out the present invention, and the technical scope of the present invention should not be narrowly interpreted according to the embodiments.

INDUSTRIAL APPLICABILITY

The present invention is widely applicable to electronic devices that require sliding covers capable of sliding with respect to the bodies. In particular, the present invention is preferably applied to slim and compact electronic devices.

The invention claimed is:
1. A sliding cover comprising:
an outside plate having front and rear faces;
a plate-like support member fixed to the rear face of the outside plate;

a movable plate-like holding member disposed in a space between the outside plate and the support member and movable in a moving direction through a movable range; and toggling means disposed between the holding member and the outside plate or the support member, wherein the support member includes two parallel racks and elongated guides disposed at both end portions of the support member and extending in the same direction as the racks;

the holding member comprising a holding plate, an even number of pinions meshed with each other and supported by the holding plate so as to be rotatable, and guiding components supported by the holding plate having engaging pieces engaged and guided by the elongated guides, the even number of pinions being disposed between the guiding components;

the pinions being meshed with the racks, and the guiding components being engaged with and slidable with respect to the elongated guides; and the toggling means biasing the holding member in a biasing direction that is reversed substantially at a midpoint of the movable range of the holding member.

2. The sliding cover according to claim 1, wherein the support member is provided with an operating projection protruding opposite to the rear face of the outside plate.

3. The sliding cover according to claim 2, wherein the operating projection has a pushing surface inclined to the moving direction of the holding member, and is supported by the support member so as to be rotatable; and the pushing surface is biased by biasing means interposed between the support member and the operating projection such that the sides of the pushing surface along the rotational axis are perpendicular to the moving direction of the holding member.

4. The sliding cover according to claim 2, wherein the operating projection is formed of a spring having a pushing surface inclined to the moving direction of the holding member; and the pushing surface is resilient to the moving direction of the holding member.

5. An electronic device having a sliding cover provided on a body such that the state of the sliding cover can be changed between a closed state to block sections to be closed and an open state for exposing the sections, wherein the sliding cover comprises an outside plate having front and rear faces, a plate-like support member fixed to the rear face of the outside plate, a movable plate-like holding member disposed in a space between the outside plate and the support member and movable in a moving direction through a movable range, and toggling means disposed between the holding member and the outside plate or the support member;

the support member includes two parallel racks and elongated guides disposed at both end portions of the support member and extending in the same direction as the racks;

the holding member comprising a holding plate, an even number of pinions meshed with each other and supported by the holding plate so as to be rotatable, and guiding components supported by the holding plate having engaging pieces engaged and guided by the elongated guides, the even number of pinions being disposed between the guiding components;

the pinions being meshed with the racks, and the guiding components being engaged with and slidable with respect to the elongated guides;

the toggling means biasing the holding member in a direction that is reversed substantially at a midpoint of the movable range of the holding member; and the sliding cover is retained on the body by fixing the holding member of the sliding cover to the body.

6. The electronic device having the sliding cover according to claim 5, wherein the sliding cover is provided with an operating projection protruding opposite to the rear face of the outside plate; and a switch provided in the body is operated when the state of the sliding cover is changed.

7. The electronic device having the sliding cover according to claim 6, wherein the operating projection has a pushing surface inclined to the moving direction of the holding member, and is supported by the support member so as to be rotatable;

the pushing surface is biased by biasing means interposed between the support member and the operating projection such that the sides of the pushing surface along the rotational axis are perpendicular to the moving direction of the holding member, and is biased in the direction in which the pushing surface pushes an operation-receiving piece of the switch provided in the body; and the biasing force of the biasing means is large enough to push the operation-receiving piece of the switch.

8. The electronic device having the sliding cover according to claim 6, wherein the operating projection is formed of a spring having a pushing surface inclined to the moving direction of the holding member;

the pushing surface is resilient to the moving direction of the holding member; and the resilience is large enough to push the operation-receiving piece of the switch.

\* \* \* \* \*